US009279821B2

(12) United States Patent
LaWhite et al.

(10) Patent No.: US 9,279,821 B2
(45) Date of Patent: Mar. 8, 2016

(54) DEICING SYSTEM IN SODAR SYSTEMS

(75) Inventors: Niels LaWhite, Somerville, MA (US);
Louis Manfredi, Hull, MA (US);
Michael Jobin, Boston, MA (US);
Walter L. Sass, Somerville, MA (US)

(73) Assignee: VAISALA, INC., Louisville, CO (US)

( * ) Notice: Subject to any disclaimer, the term of this patent is extended or adjusted under 35 U.S.C. 154(b) by 1432 days.

(21) Appl. No.: 12/565,078

(22) Filed: Sep. 23, 2009

(65) Prior Publication Data

US 2010/0071890 A1    Mar. 25, 2010

Related U.S. Application Data

(60) Provisional application No. 61/099,378, filed on Sep. 23, 2008.

(51) Int. Cl.
| G05D 23/00 | (2006.01) |
| F28D 15/00 | (2006.01) |
| G01S 15/88 | (2006.01) |
| G01S 15/87 | (2006.01) |
| H01Q 1/02 | (2006.01) |
| H01Q 15/16 | (2006.01) |
| G01P 5/24 | (2006.01) |

(52) U.S. Cl.
CPC ........ *G01P 5/24* (2013.01); *G01S 15/885* (2013.01)

(58) Field of Classification Search
None
See application file for complete search history.

(56) References Cited

U.S. PATENT DOCUMENTS

| 2,679,003 | A | * | 5/1954 | Dyke et al. ................ 343/704 |
| 2,679,004 | A | * | 5/1954 | Dyke et al. ................ 343/704 |
| 3,884,217 | A | * | 5/1975 | Wartes ...................... 126/571 |
| 4,021,816 | A | * | 5/1977 | Peck ......................... 343/840 |
| 4,252,107 | A | * | 2/1981 | Horton ....................... 126/605 |
| 4,259,671 | A | * | 3/1981 | Levin ......................... 343/704 |
| 4,286,581 | A | * | 9/1981 | Atkinson, Jr. .............. 126/585 |
| 4,307,710 | A | * | 12/1981 | Natter ....................... 126/700 |
| 4,323,054 | A | * | 4/1982 | Hummel .................... 126/631 |
| 4,368,471 | A | * | 1/1983 | Walton, Jr. ................. 343/704 |
| 4,568,156 | A | * | 2/1986 | Dane ......................... 359/853 |
| 4,743,095 | A | * | 5/1988 | Dane ......................... 359/853 |
| 4,866,452 | A | * | 9/1989 | Barma et al. .............. 343/704 |
| 5,002,378 | A | * | 3/1991 | Colarusso et al. ......... 359/845 |
| 5,010,350 | A | * | 4/1991 | Lipkin ................. H01Q 1/02 343/704 |
| 5,509,304 | A | * | 4/1996 | Peterman et al. ......... 73/170.13 |
| 5,729,238 | A | * | 3/1998 | Walton, Jr. ................. 343/704 |

(Continued)

FOREIGN PATENT DOCUMENTS

WO    WO 2008108894 A2 *  9/2008

OTHER PUBLICATIONS

International Search Report and Written Opinion of ISA mailed Nov. 18, 2009, in corresponding PCT/US09/57976; Int'l Filing Date Sep. 23, 2009.

(Continued)

*Primary Examiner* — Gregory Huson
*Assistant Examiner* — Eric Gorman
(74) *Attorney, Agent, or Firm* — Maschoff Brennan

(57) ABSTRACT

A system for heating the sound-reflective mirror surface of a phased array monostatic sodar apparatus. The system has a heat source located at a position that is spaced from the mirror, a control system that controls the operation of the heat source, a working fluid that is heated by the heat source and used to transfer heat from the source to the mirror, and a delivery system that constrains the heated working fluid and delivers it from the heat source to the mirror.

20 Claims, 21 Drawing Sheets

(56) References Cited

U.S. PATENT DOCUMENTS

| | | | | |
|---|---|---|---|---|
| 5,796,368 | A * | 8/1998 | Arthur, III | 343/704 |
| 5,798,735 | A * | 8/1998 | Walton, Jr. | 343/704 |
| 5,963,171 | A * | 10/1999 | Jones | 343/704 |
| 6,064,344 | A * | 5/2000 | Walton | 343/704 |
| 6,084,550 | A * | 7/2000 | Jones | 343/704 |
| 6,175,335 | B1 * | 1/2001 | Ishikawa | H01Q 1/02 343/704 |
| 6,427,531 | B1 * | 8/2002 | Chintawongvanich | 73/170.13 |
| 6,445,349 | B1 * | 9/2002 | Jones | 343/704 |
| 6,723,971 | B1 * | 4/2004 | Petrenko et al. | 219/770 |
| 6,897,832 | B2 * | 5/2005 | Essig et al. | 343/912 |
| 7,669,593 | B2 * | 3/2010 | Blackmon, Jr. | F24J 2/4647 126/570 |
| 7,793,652 | B1 * | 9/2010 | Delgado | 126/565 |
| 8,004,935 | B2 * | 8/2011 | LaWhite et al. | 367/188 |
| 8,009,513 | B2 * | 8/2011 | LaWhite et al. | 367/90 |
| 8,174,930 | B2 * | 5/2012 | LaWhite et al. | 367/90 |
| 8,456,955 | B2 * | 6/2013 | LaWhite et al. | 367/90 |
| 8,659,490 | B2 * | 2/2014 | Walton | 343/704 |
| 2003/0020667 | A1 * | 1/2003 | Essig, Jr. | E04H 15/20 343/832 |
| 2004/0031517 | A1 * | 2/2004 | Bareis | 136/246 |
| 2004/0207566 | A1 * | 10/2004 | Essig, Jr. | F21S 11/00 343/878 |
| 2005/0018154 | A1 * | 1/2005 | Box et al. | 355/30 |
| 2005/0091979 | A1 * | 5/2005 | Bareis | 60/641.14 |
| 2005/0236144 | A1 * | 10/2005 | Takeuchi | 165/104.33 |
| 2006/0033674 | A1 * | 2/2006 | Essig, Jr. | A01K 61/007 343/912 |
| 2006/0203362 | A1 * | 9/2006 | Gohman et al. | 359/820 |
| 2008/0277198 | A1 * | 11/2008 | LaWhite et al. | 181/198 |
| 2008/0298175 | A1 * | 12/2008 | LaWhite et al. | 367/89 |
| 2010/0107633 | A1 * | 5/2010 | Tsao | 60/641.8 |
| 2010/0319684 | A1 * | 12/2010 | Almogy et al. | 126/714 |
| 2011/0036345 | A1 * | 2/2011 | Almogy et al. | 126/714 |
| 2011/0058454 | A1 * | 3/2011 | LaWhite | G01P 5/241 367/138 |
| 2011/0247679 | A1 * | 10/2011 | Shelef | F24J 2/07 136/246 |
| 2012/0294121 | A1 * | 11/2012 | LaWhite et al. | 367/140 |
| 2013/0061910 | A1 * | 3/2013 | Almogy et al. | 136/248 |
| 2013/0112237 | A1 * | 5/2013 | Almogy et al. | 136/246 |
| 2013/0156504 | A1 * | 6/2013 | McAlister | 405/128.6 |
| 2014/0218248 | A1 * | 8/2014 | Schulz | H01Q 15/16 343/761 |
| 2015/0184895 | A1 * | 7/2015 | Shelef | F24J 2/461 134/99.1 |
| 2015/0287866 | A1 * | 10/2015 | Shelef | H01L 31/0547 136/246 |

OTHER PUBLICATIONS

Int'l Prelim Rept on Patentability and Written Opinion of ISA mailed Mar. 29, 2011 in corresponding PCT/US09/57976; Int'l Filing Date Sep. 23, 2009.

* cited by examiner

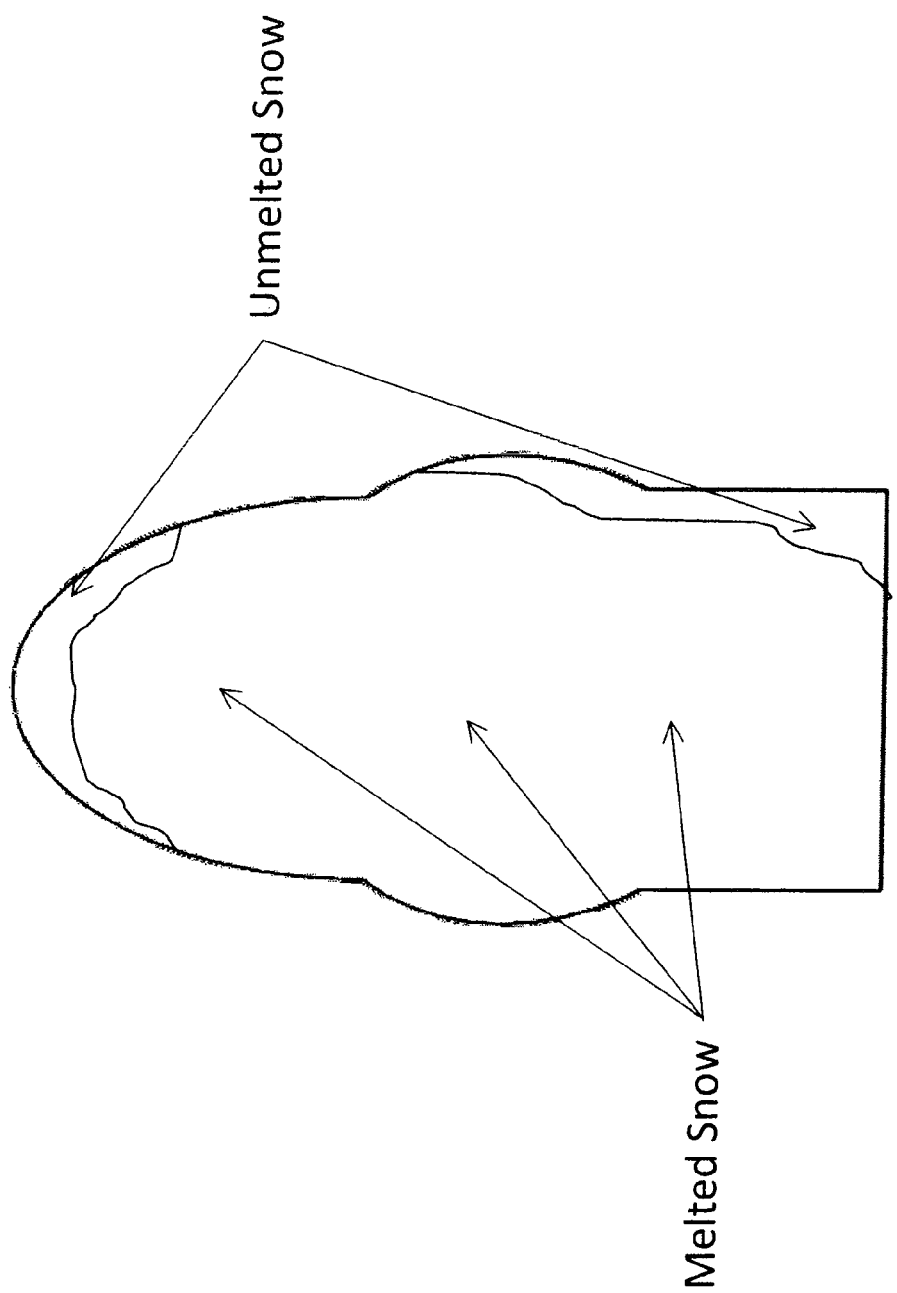

DEICING SYSTEM IN SODAR SYSTEMS

CROSS REFERENCE TO RELATED APPLICATION

This application claims priority of provisional patent application Ser. No. 61/099,378 filed on Sep. 23, 2008. The entire contents of this priority application are incorporated herein by reference.

FIELD OF THE INVENTION

The present invention relates to a system for remotely detecting atmospheric phenomena such as wind speed using directed sound waves.

BACKGROUND OF THE INVENTION

Sodar systems employ directed sound waves to detect atmospheric phenomena such as wind speed. By directing sound beams into the atmosphere in a number of directions, and measuring the Doppler shift of echoes returned from turbulence and discontinuities in the atmosphere, wind speed and other atmospheric phenomena can be accurately estimated. The predominant type of sodar in current use is the monostatic phased array sodar. Monostatic sodar systems emanate sound beams and listen for their reflections from a single location. Phased array monostatic sodars direct the beams in different directions, and are sensitive to echoes returned from these directions, by use of an array of sound transducers which transmit and receive in groups of differing phase so as to direct the transmitted sound beams and regions of sensitivity as desired.

Phased array monostatic sodars are often arranged with the phased array mounted vertically in a housing which transmits the beams in a generally horizontal direction. The beams impinge upon a flat sound reflective surface, or mirror, which is mounted at a generally 45 degree angle to horizontal. By means of this mirror, the beams are reflected upwards into the generally vertical direction. This arrangement, which is known prior art, allows the beams to be projected in the necessary directions, while substantially protecting the transducers comprising the array and the associated electronics from rain, snow and other forms of precipitation which might interfere with operation or even permanently damage the array system.

A shortcoming of this technique is that snow, sleet, and unevenly accumulating ice which may collect on the mirror can prevent the system from operating properly during, and following inclement winter weather. Prior art attempts at mirror de-icing systems have shortcomings which render them marginal at best.

One prior attempt at a mirror de-icing system used a propane radiant catalytic heater mounted beneath the mirror surface, in which the heater exhaust was vented directly into the sodar enclosure below the mirror. This system was inadequate due to the uneven distribution of the heat generated by the system. Snow melt was accomplished over the relatively small area directly warmed by the heater. Despite the relatively good thermal transfer properties of the aluminum mirror used, additional heat from the radiant heater was consumed boiling water in the area directly warmed, and heating the air above this area, while unacceptable quantities of ice and snow remained in other portions of the mirror. An additional shortcoming of this system was that the moisture generated when the radiant heater combusted propane was released into the lower housing of the instrument, where it condensed as water and ice on the rear surface of the mirror and side walls of the enclosure, saturating internal sound-proofing material and providing a source of moisture which could be harmful to electronic equipment in the enclosure.

There is also a de-icing system with an electrical resistance heater mounted on the upper surface of the mirror. The quantity of energy required for an effective de-icing system is such that an electrical deicer cannot be expected to operate effectively using battery, or solar panel-and-battery power supply. This constraint thus forces the system to be installed with an internal-combustion engine based generator system, or with supply of utility power from an external source.

SUMMARY OF THE INVENTION

The invention comprises a heating system for melting ice and snow, and/or preventing the accumulation of ice and snow on the reflective surface on the mirror element of a sodar of the type equipped with a generally vertically mounted phased transducer array which transmits beams in a generally horizontal direction to be reflected off the mirror into the desired generally vertical direction.

The inventive heating system comprises a heat source which transfers heat to a heat transfer medium, which is a gaseous or liquid fluid. The fluid circulates through one or more channels, pipes or suitable circulation chambers in order to distribute the heat in a sufficiently even manner over the surface of the mirror element.

In the preferred embodiment, the system comprises a propane fired catalytic heater designed to transfer the heat generated to a liquid heat transfer medium. This heater is a fuel-efficient self-contained unit with a combustion air intake and an exhaust outlet which allow the combustion by-products to be vented externally to the sodar apparatus so as to prevent undesirable accumulation of these products within the instrument housing. The heater may be an off-the-shelf unit intended to serve as an engine block heater for large diesel engines used in cold climates but suitable for the application, or it may be a different type or make of catalytic or other type of heater, or even one that is custom designed for the application. The heater could use fuels other than propane. In the preferred embodiment, the heater is mounted within the main sodar apparatus housing. Alternatively this heater can be mounted in an enclosure external to the main apparatus housing so as to minimize the risk of fuel gas or harmful combustion byproducts accumulating within the main apparatus housing.

The preferred embodiment further comprises a circulation pump which circulates the liquid, and a circulation network of pipes affixed in close thermal contact with the rear surface of the mirror to allow heat from the liquid to be transferred to the mirror in a manner that sufficiently distributes the heat so that the maximum fraction of the heat is effectively used to melt frozen precipitation falling onto or present upon the exposed mirror surface. In the preferred embodiment, the working fluid is an environmentally benign antifreeze solution of propylene glycol and water, although other suitable liquids could alternatively be used.

In the preferred embodiment the heater is controlled by a signal from the microprocessor systems which accomplish normal operation of the sodar apparatus. In the preferred embodiment, the heater is controlled by the detection of precipitation by means of an electronic precipitation sensor mounted on the upper lip of the sodar apparatus, and by observation of the ambient temperature, which must also be measured incidental to the sodar apparatus' accurate measurement of wind speed. A mirror heating cycle will be started when the controller detects the simultaneous presence of precipitation and freezing ambient temperature. The heating cycle can be terminated when a temperature sensor on the mirror detects that the mirror is warm enough to ensure the melting of any snow or ice which might have been present.

In the preferred embodiment the heater is supplied propane from a commonly available refillable tank of the type typically used for gas barbecue grills. It is worth noting that the gas in a 20 pound LP tank is capable of providing approximately 430,000 British Thermal Units (BTUs) of heat energy. In order to store an equivalent amount of heat in lead-acid storage batteries, roughly one hundred and six, 100 Ampere-hour deep cycle batteries, each capable of storing 1.2 kWh (or 4100 BTUs) would be required. This demonstrates why the inventive heating system is so much more practical than any system based on battery supplied electric heaters. Alternatively, for sites where deicing demand is anticipated to be particularly severe, or where visits to service the apparatus must be infrequent, or both, multiple gas tanks or tanks of a larger type can be used.

In an alternative embodiment of the inventive system there may be an auxiliary pipe to circulate the working fluid along the drain path, or scupper, of the apparatus; the scupper allows any precipitation which might fall on the mirror to drain out of the instrument. The purpose of this auxiliary pipe is to prevent the possible formation of an ice dam which might block the drainage of the apparatus if only the mirror itself were heated.

In another alternative embodiment of the inventive system, the piping may be replaced with a plenum cavity affixed to the rear of the mirror, which is entirely filled with liquid working fluid.

In another alternative embodiment of the inventive system, the heater is of a type designed to heat air, and this air is circulated, either by means of convection or by use of an electrically powered blower, through one or more passageways affixed to the rear of the mirror.

In another alternative embodiment of the inventive system, the heater is of a radiant type, or of a type intended to heat air, and closed, sealed heat pipes are used with alcohol, low pressure water, or some other suitable low boiling point working fluid to distribute the heat sufficiently evenly over the surface of the mirror.

In another alternative embodiment of the inventive system, the heater is a type intended to heat air, or of a type intended to be used for radiant heating, and is mounted within a plenum cavity directly beneath the mirror. The plenum is equipped with inlets and outlets leading to the exterior of the apparatus to allow sufficient escape of combustion byproducts, and to provide sufficient fresh make-up air, but the majority of the air and combustion byproducts are allowed to circulate within the plenum, either by convection or by means of a blower or fan, so as to sufficiently evenly distribute the heat over the surface of the mirror.

In any of these embodiments, there may be a further variation in that one or more thermal solar collectors are used to heat the working fluid, be it liquid or air, so as to reduce the consumption of gas, or alternatively to serve as a back-up source of heat in the event that the gas supply is exhausted, or further alternatively to serve in place of the gas heater entirely in situations where regulatory or other constraints may prevent the use of gas. Needless to say, in this alternative embodiment the heating system will be unlikely to prevent the accumulation of ice or snow on the mirror during a precipitation event, since sufficient solar energy is unlikely to be available during such events. Nevertheless, such a system retains utility since the ability to melt the accumulated precipitation when solar energy later becomes available may return the sodar to normal operation far sooner than would be the case if precipitation removal depended on chance warm weather or a service visit to the apparatus which might have become inaccessible due to the snow or ice event.

In yet another alternative embodiment the working fluid is a liquid, and is shared with the cooling system of an internal combustion generator, the waste heat from the generator being used to heat the liquid that is used to heat the mirror. Such a system is of little value in the case of an electrically-efficient sodar system such as manufactured by the assignee, but might be of value to a sodar apparatus that is sufficiently inefficient in its use of electricity that a generator is required for long-term operation at remote sites.

In other alternative embodiments, the controlling system which controls the operation of the heater may be separate from the microprocessors which control the main operating functions of the sodar apparatus. In a further alternative embodiment, unexplained degradation of the performance of the sodar system may be used as an indication for the controller that heating is needed. In another alternative embodiment, the velocity sensing capabilities of the apparatus may be used as a means to detect or sense the presence of precipitation so as to avoid the need for sensors dedicated to the detection of precipitation; such precipitation sensing via interrogation of the normal sodar velocity sensing system in a monostatic sodar system is disclosed in provisional patent application Ser. No. 61/158,589, with a filing date of Mar. 9, 2009, the disclosure of which is incorporated herein by reference.

In yet a further alternative embodiment, the control of the heater may be initiated remotely (or even locally) by a human operator or an automated remote control system, based on observation of measurements from any or all of the sensors mentioned above or additionally based on information about local weather conditions obtained from sources external to the instrument.

This invention features a system for heating the sound-reflective mirror surface of a phased array monostatic sodar apparatus, comprising a heat source located at a position that is spaced from the mirror, a control system that controls the operation of the heat source, a working fluid that is heated by the heat source and used to transfer heat from the heat source to the mirror, and a delivery system that constrains the heated working fluid and delivers it from the heat source to the mirror.

The heat source may comprise a heater fueled by a combustible gas. The combustible gas may be propane, and the heater may operate catalytically, oxidizing the propane without an open flame. The delivery system may comprise a plenum chamber in which the heater is mounted, wherein one surface of this chamber is the rear surface of the mirror, and in which the combustion products from the heater discharge directly into the plenum, and from which air for combustion is obtained, the working fluid being a mixture of air and heater combustion by-products, and the plenum being equipped with a vent and inlet to allow sufficient fresh air to enter to support catalytic combustion, and sufficient combustion byproducts to exit, but in which the mixture of air and combustion byproducts also circulates as a working fluid to transfer the heat to the mirror.

The working fluid may be a liquid. The delivery system may comprise an electrically driven circulation pump that circulates the working fluid from the heater to the mirror and back. The delivery system may further comprise a series of pipes within which the working fluid circulates, wherein the pipes are coupled to the mirror in a manner that accomplishes an effective thermal connection that efficiently and relatively evenly transfers heat from the pipes to the mirror. The system may further comprise one or more conductive structures to which one or more of the pipes are coupled, the structures sized and shaped so as to conform to the outside surface of the pipe over a majority of the pipe's circumference, and with a generally flat surface that is coupled to the rear surface of the mirror, to accomplish the effective thermal connection between the pipes and the mirror. The system may further comprise a thermally conductive epoxy adhesive used to make a joint of low resistance to heat transfer between the conductive structures and the mirror. The thermally conductive epoxy adhesive may also be used to make a joint of low resistance to heat transfer between the pipe and the conductive structure. The pipes, the conductive structures and the mirror may all be made of the same metal.

The system may further comprise a thermally conductive grease used to make a junction of low resistance to heat transfer between the conductive structure and the pipe, the conductive grease allowing the pipe and conductive structure to shift relative to each other as necessary so as to minimize damaging stresses in either component due to differential thermal expansion. The heat source may further comprise a solar heating panel through which the working fluid can also be circulated, to provide supplemental solar heat to the working fluid. The sodar apparatus may have a scupper opening to drain precipitation liquid from the apparatus, and the delivery system may be further constructed and arranged to circulate heated working fluid through the location of the scupper.

The working fluid may be a liquid that is circulated by convection. The delivery system may comprise a liquid jacket coupled to the mirror so as to create a liquid chamber located behind substantially all of the rear surface of the mirror, wherein the working fluid circulates through the liquid jacket. The fluid may circulate by means of a pump or convection. The working fluid may be an antifreeze solution. The heat source may comprise a solar panel. The heat source may comprise an internal combustion engine with a liquid cooling system and the working fluid is a liquid that is shared with the cooling system of the internal combustion engine.

The working fluid may be air. The delivery system may comprise an electrically driven blower or fan that circulates the air. The delivery system may further comprise ducting that is constructed and arranged such that it contains the heated air such that the heated air circulates over substantially all of the rear surface of the mirror. The air may be circulated by convection. The working fluid may comprise a low boiling point fluid and the delivery system comprises a series of sealed heat pipes that contain the working fluid.

The control system may comprise a means to sense precipitation, an ambient temperature sensor and a mirror temperature sensor that senses the temperature of the mirror, wherein the control system turns on the heat source upon the simultaneous detection of precipitation and an ambient temperature or a mirror temperature close to or below the freezing point of water. The control system may turn off the heat source when the mirror temperature reaches at least a certain temperature above freezing.

BRIEF DESCRIPTION OF THE DRAWINGS

Various other objects, features and advantages of the present invention will become fully appreciated as the invention becomes better understood when considered in conjunction with the accompanying drawings, in which like reference characters designate the same or similar parts throughout the several views, and wherein:

FIGS. 4A-4C show the performance of a prior art heater system, the early inventive system and the embodied system, respectively.

DETAILED DESCRIPTION OF EMBODIMENTS OF THE INVENTION

Figure 1A:
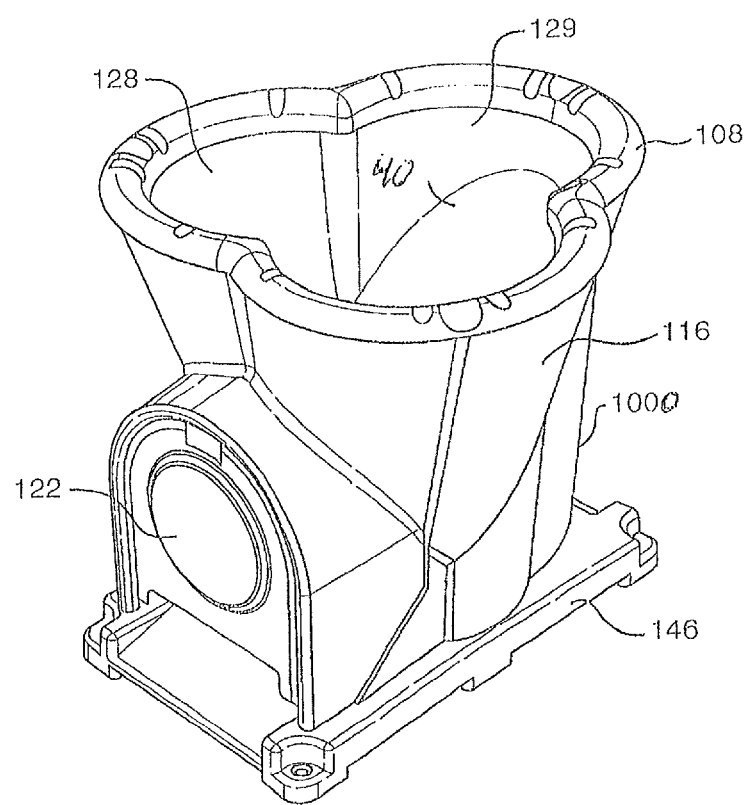
FIGS. 1A-1D are perspective, top and cross-sectional views of a sodar apparatus with which the invention can be used.
Figure 1B:
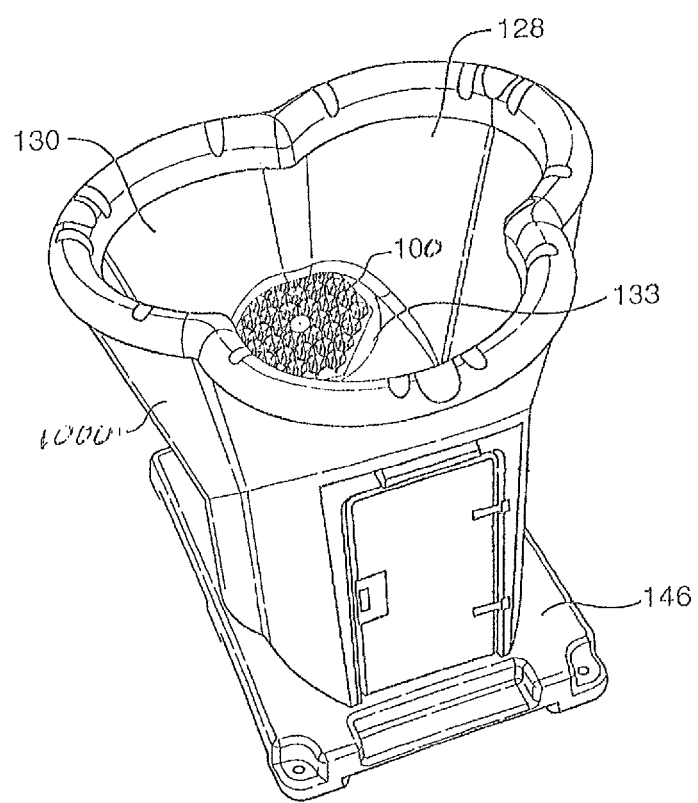
Figure 1C:
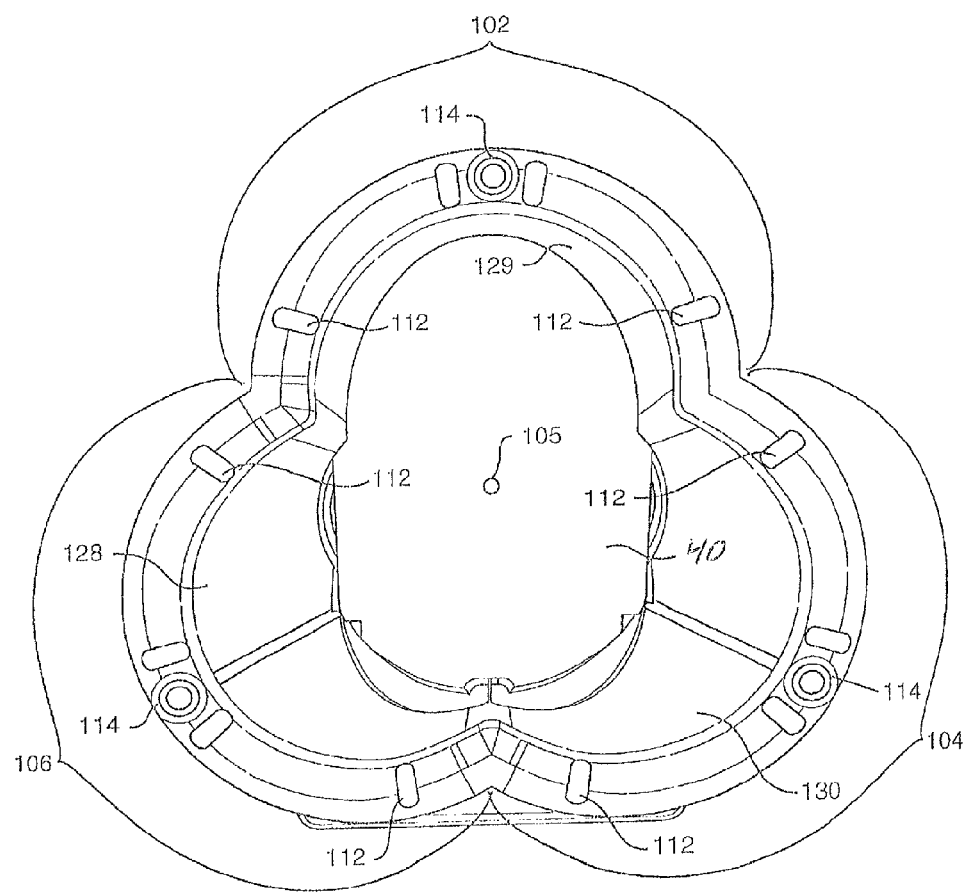
Figure 1D:
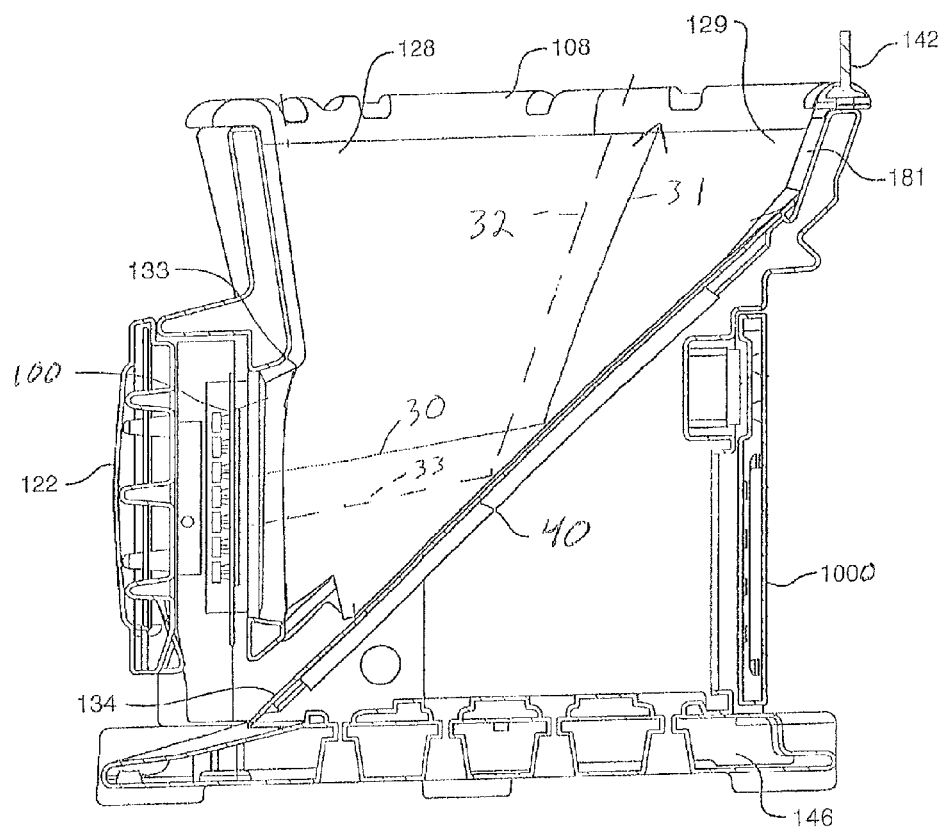

The inventive system is used in a sodar apparatus of the type that uses a generally vertically-mounted transducer array, and a sound mirror that is exposed to the elements. One example of such a sodar apparatus is shown in FIGS. 1A-1D, it being understood that this is only an example of a sodar apparatus and system of the type with which the invention can be used, and in no way limits the scope of the invention. The phased array monostatic sodar apparatus consists of an array 100 of individual acoustic transducers. The transducers are connected to an electronics and data processing system (not shown), which causes them to emit phased array beams of sound 30 in the generally horizontal direction as shown. These beams impinge upon a solid smooth surface, the 'sound mirror' or 'mirror' 40, which causes the sound beams to be reflected generally upwards as reflected beams 31. Mirror 40 is typically an aluminum plate, but could be made of other sufficiently heat conductive and sound reflective materials that can stand up to outdoor exposure, that would still accomplish the invention. Non-limiting examples include brass or copper (which present an advantage that the pipe, mirror and any other heat transfer structures can be made of this material and brazed or soldered together), steel, or thermally-conductive plastic or fiberglass.

The reflected sound beams 31 impinge upon turbulence and density variations in the atmosphere above. Some of the sound energy from these beams is reflected back along the same paths as outbound beams 31 and 30 (the return beams are depicted with dashed lines 32 and 33), returning to the transducers in phased array 100 where they are detected by receiving components of the electronics package. These components of the sodar system are mounted in housing 1000 which supports the various components, and which may also serve to block stray sound transmission and reception from undesired directions.

Tunnel section 133 of housing 1000 provides an effective shield to protect array 100 from precipitation. Mirror 40 is, by necessity for the apparatus to perform its intended function, exposed to precipitation. In cases where the precipitation falls in the form of liquid rain, it can drain harmlessly and without interfering with system operation through a lower opening or "scupper" section 134 of housing 1000.

The particular construction and arrangement of the sodar apparatus, using the hexagonal arrangement of transducers in the array and the housing which conforms closely to the desired beam shapes described herein are preferred, and described in order to better describe the environment in which the invention is used. But neither the hexagonal array nor the housing closely conforming to the beam shapes are limitations of the invention, as other sodar constructions, wherein arrays arranged in non-hexagonal patterns, and housings which do not closely conform to beam shape can equally benefit from the invention described herein, as long as the construction does include an array mounted generally vertically and protected from direct precipitation, the array emitting sound horizontally which is reflected off a reflective surface that is exposed to precipitation.

Monostatic sodars employ sequential, directed beams of sound as part of their operation. Individual acoustic transducers typically emanate sound in a wide wavefront approximating the surface of a sphere, rendering them unsuitable for sodar use without a focusing mechanism. Array 100 of closely packed and evenly-spaced transducers can accomplish focusing by producing a complex interfering pattern of wavefronts that effectively creates a principal beam that is narrower than that of an individual transducer. The angular spread of the beam is related to the number of transducers in the array: more transducers generally can create a narrower beam. Arrays of thirty-two to sixty transducers are usually adequate to produce beams that are narrow enough for sodar applications; array 100 has thirty-six transducers. Each transducer has a circular actuator and horn. The transducers are closely packed along a number of parallel rows (seven such rows in the non-limiting preferred embodiment of the invention, with the transducers in adjacent rows offset from one another in a direction orthogonal to the rows by about one half (more specifically $\sqrt{3}/2$) of a transducer diameter. This arrangement is termed herein a generally hexagonal grid packing arrangement.

Each transducer is preferably of hexagonal overall perimeter shape, closely circumscribing a circular active horn region of about 3 inches in diameter. The transducer is based on a standard piezo-electric horn "tweeter" element modified in external shape to facilitate the generally hexagonal grid packing arrangement. The paper cone of the transducer can be replaced with a plastic cone (preferably polycarbonate or Mylar (which is a biaxially-oriented polyethylene terephthalate film) or equivalent, to improve the weather-resistance of the apparatus. The transducers are provided with connectors for convenient installation and replacement in the apparatus. The transducer is designed to operate efficiently as both a transmitter and receiver of sound at the approximately 4000 Hz (more specifically 4425 Hz) operating frequency preferred for the apparatus. The size of the transducers is such that the phased array technique can create beams of sound with good directionality using a reasonable number of transducers. Other shapes and types of transducer elements are not as efficiently assembled into hexagonal arrays, do not operate efficiently as both transmitter and receiver at the desired operating frequency, and are not as suitable for installation in an apparatus operating in an exposed environment.

The generally hexagonal external shape of the array, and the generally hexagonal grid packing arrangement of the array, also permits the directional control necessary to steer beams without mechanical devices. Beam steering is accomplished by driving the transducers in a sequence of parallel rows, with the transducers within each row driven in phase with each other, and each of the rows driven at the same wavelength but with successive, equal phase shifts row-to-row. If there is no phase shift between rows, the principal beam is emitted along an axis that is orthogonal to the plane of the array. As phase shift is introduced, the interference pattern changes such that the beam is directed at altitudes that are no longer vertical (assuming the array is horizontal). Also, the beam is orthogonal to the axes along which the transducers making up each of the rows lie. Thus, by driving the transducers in rows of differing relative orientation, beams can be created that are directed along desired azimuthal directions.

Array 100 is comprised of a series of rows of closely-packed transducers. Each transducer has a generally hexagonal perimeter shape. This perimeter closely circumscribes the active transducer region, which is circular. The hexagonal perimeter primarily exists to facilitate assembling the array. There may be some additional advantage if the active transducer region itself were hexagonal, effectively eliminating all dead (i.e., non sound producing) area in the array. Similarly, a square transducer with a square active horn area, along with the transducers in adjacent rows offset by about one-half of the transducer width, could provide some (but not all) of the benefits as compared to the prior-art rectangularly arranged arrays. The array itself preferably has a generally hexagonal perimeter.

The generally hexagonal array is physically symmetric about six radial axes spaced sixty degrees apart. This can be accomplished with two or more transducers in each of the six outer rows making up the six sides of the hexagon; thus the minimum number of transducers is seven. Also, the transducers are closely packed in the array, with adjacent parallel rows of the array having their axes offset by $\sqrt{3}/2$ (approximately 0.866) times the transducer width. The generally hexagonal grid packing arrangement allows operation to sequentially produce from three to six generally conical beams that emanate along principal beam axes that are generally symmetrical around and lie on the surface of a virtual vertical cone having its apex located on an axis that is normal to the array. The preferred embodiment creates three such beams spaced 120° apart. The beams are at a favorable altitude that is determined by the manner of operation. The effective length of the beam is about 400 times the diameter of the array.

As the transducer arrangement of array 100 is symmetric with respect to each of the six sides of the hexagonal array, the three beams are essentially identical to one another, the only difference being the azimuthal direction of the beams' main axes. Up to six such beams could be created.

Horn-shaped housing 1000 is similarly symmetrically shaped, defining three identically-shaped lobes 102, 104 and 106 spaced 120° apart about central vertical axis 105 of housing 1000. In housing 1000, array 100 is preferably positioned vertically, behind access door 122 and directly facing the flat sound-reflecting surface of mirror 40 that is 45° from vertical so that it acts as a sound mirror. See the cross-sectional view of FIG. 1D. This arrangement acoustically approximates the same array 100 being positioned horizontally at the center bottom of the enclosure. The vertical array position inhibits the transducers from collecting water, ice, snow, or debris.

In one non-limiting embodiment, each transducer is about three inches in diameter, and the array is operated at frequencies corresponding to wavelengths of approximately 3 inches. A typical frequency may be 4425 Hz. Sounds near this wavelength have been found to both reflect from and travel through turbulence and thermal gradations in the atmosphere, a compromise that is essential to sodar operation. With the preferred array made up of thirty six transducers in seven rows, the phase shift from row to row is about 60 degrees, (or, about $3.75 \times 10^{-5}$ sec) which accomplishes an essentially vertical beam, tilted slightly from the vertical at about ten degrees (more specifically at 11.2 degrees) in altitude from the normal to the plane of the transducers, and with a main beam angular width of about five degrees measured from the main beam axis to the half power point. The beam power drops to about zero at a null that is located at about ten degrees from the beam main axis (a total beam width of about twenty degrees). Preferably, each of the three lobes, 102, 104 and 106 of housing 1000 defines an inner surface that lies at about the location of this null for beams. In cases in which the enclosure is lined with sound-absorbing material, this inner surface is defined as the inner surface of the sound-absorbing material. This allows the full main beam to be utilized in atmospheric sensing while helping to intercept and thus squelch both unwanted emanations that are not part of the main beam, and unwanted return signals that are not reflections of the main beam. Alternatively, the inner surface of the enclosure can lie closer to the main axes of the beams, which will create narrower, less powerful beams.

The non-limiting preferred embodiment of the array has thirty-six transducers; there is no transducer at the center of the array, although there could be. This is primarily due to the electronics in the preferred embodiment, which were designed around integrated circuits that are generally used for surround sound applications. These circuits each have 3 left and 3 right channels—for a total of six each. So each sixty-degree segment of the array can be neatly handled by one of these circuits, for a total of six geometrically and electronically identical subdivisions of the transmitting circuit. Adding the 37th transducer to the center of the array thus adds substantial complexity to the transmitting circuit design, as well as to the firmware. Testing indicated that the center speaker doesn't have a substantial impact on the directionality of the unit—at best it might increase directionality by 3%, while it increases cost and complexity of the electronic equipment by perhaps as much as 17%. Accordingly, leaving the center speaker out is an appropriate trade-off between cost and functionality.

The non-limiting preferred embodiment of the enclosure is comprised of a housing 1000 shaped to partially envelop with some accuracy the multiple desired beams and corresponding cones of sensitivity of the sodar. Interior sidewalls 128, 129 and 130 are partially conical, each circumscribing approximately half of a main beam, and located at the first null, as further described in a prior application that has been incorporated by reference herein. These walls are preferably lined with a sound absorbing material. For example the interior of sidewalls 128 and 129 shown in the drawing are lined with one or more layers of sound absorbing material 181. The generally conical wall 133 that is very close to array 100 is also lined with material 181.

Upper lip 108 of housing 1000 is preferably rounded with a large radius, preferably equal to or larger than the wavelength of the transmitted sound. Three identical semi-elliptical upper lip segments tie the structure together by being bolted to threaded inserts in the enclosure body 116 at six positions 112, and to pairs of threaded inserts at three positions 114. The lip sections essentially lie along the intersection of a horizontal plane and each of the three angled cones that are defined by the first nulls of the three sound beams. Enclosure lifting and/or anchoring eyebolts can be threaded into inserts at locations 114. Alternatively, a satellite or cellular antenna 142 can be mounted at one location 114.

Since the beams of a single-array sodar emanate from the surface of a single phased array 100, but in different directions, their conic profiles overlap spatially near the array. This means that the enveloping structure has an unusual "fluted" shape as shown in the drawings. If the shape were extended vertically, it would become a three-horned enclosure joined at the base. Since the height of such a structure would be impractical, the fluted shape is best for the desired portability of the sodar system. The enclosure wall making up each of the three flutes generally defines a semi-circle in cross section; since the cones are tilted from the vertical, the horizontal cross section is elliptical. The cones all emanate from array 100, taking into account 45° reflector 40. In the preferred embodiment, the structure has an overall height, from bottom of the mounting base 146 of approximately 74 inches. The width measured to outside of lip 108 at the widest point between any two flutes is approximately 70 inches.

In the non-limiting preferred embodiment, the housing envelops accurately the shape of the conic beams as they travel approximately horizontally from the phased array to the mirror, and also envelops the beam shape as it reflects off the mirror and out the top of the housing. Surface 133 surrounds the three conical sound beams immediately following their emission from array 100. This surface encloses the union of the volume taken up by the three beams. The shape of surface 133 is essentially a conical section. More specifically, preferably its shape is an extension of the three-lobed fluted shape of the interior of the enclosure, reflected off of the sound mirror at the location of surface 133. Immediately after exiting array 100, the beams overlap substantially enough that the difference in shape between three overlapping cones and a single essentially conical shape is not very pronounced, and surface 133 could, in fact, be formed as a simple conical section surface with little difference in performance. Although the extent of surface 133 is not large, its proximity to array 100 is such that it is of more significant importance in intercepting the sound beams' side lobes than its size would suggest.

Other embodiments are possible where the shape of the housing does not continuously follow the shape of the beams. In an extreme case, the housing could have an arbitrary, for example rectilinear, shape with only the opening at the top contoured to the cross-section of the beams as they exit the housing, for example through use of the same lip as in the preferred embodiment. To perform as well as the preferred embodiment, such a rectilinear housing would require superior sound absorbent material to damp internal beam reflections.

In the preferred embodiment, the housing is equipped with an opening, or scupper (134 in FIG. 1D) at the lower end of the reflector, below the vertically mounted phased array, sized to provide a passage for rainwater, leaves and other detritus to exit the housing. Further, for cold climate installations, the reflector is equipped with the inventive heating system to melt any snow or ice that might accumulate, and allow this precipitation to also exit the scupper in liquid form. Other embodiments are possible, for example with a drain for precipitation liquid but without any provision for allowing the exit of detritus where such is unlikely to accumulate, or by provision of a suitable screen that is sufficiently transparent to sound over the opening of the housing to inhibit detritus from entering the housing in the first place.

In the preferred embodiment, the housing is employed with a hexagonal phased array that transmits three beams angled off vertical spaced at 120° angles from each other in azimuth. However, other embodiments are possible where the housing is fitted to other phased array architectures, including a more conventional rectangular grid packing arrangement phased array transmitting one directly vertical beam and two angled beams oriented at a 90° angle to each other in azimuth, as detailed in U.S. Pat. No. 4,558,594. In this latter case, the overall performance of the system will be inferior to the preferred embodiment with three or more symmetric beams. However, the housing, with a lip that defines two or more generally partially elliptical lip segments, and preferably with walls that are located at the first null of each of the three beams, will be of considerably greater value due to the significantly poorer directional performance of the prior art rectangular grid array relative to the hexagonal grid array of the preferred embodiment.

In the preferred embodiment the hexagonal phased array is mounted such that one of the three beams leaves the reflector angled in an azimuth direction opposite the array, and the other two beams are oriented in azimuth reflecting generally back over the array at 60° angles resulting in a most compact overall size. Where size is a less significant concern, other embodiments are possible.

The preferred, but non-limiting, embodiment of the sodar apparatus with which the inventive deicing system can be used, and the operation of a sodar system using this apparatus, are further disclosed in the following commonly-assigned pending US patent applications, all of which are incorporated herein by reference in their entireties: Ser. No. 11/934,915, with a filing date of Nov. 5, 2007, entitled "Transducer Array Arrangement and Operation for Sodar Applications", Ser. No. 12/117,994, with a filing date of May 9, 2008, entitled "Sodar Housing with Non-Woven Fabric Lining for Sound Absorption", Ser. No. 12/125,166, with a filing date of May 22, 2008, entitled "Housings For Phased Array Monostatic Sodar Systems", and Ser. No. 12/129,806, with a filing date of May 30, 2008, entitled "Waterproof Membrane Cover for Acoustic Arrays in Sodar Systems."

Figure 2:
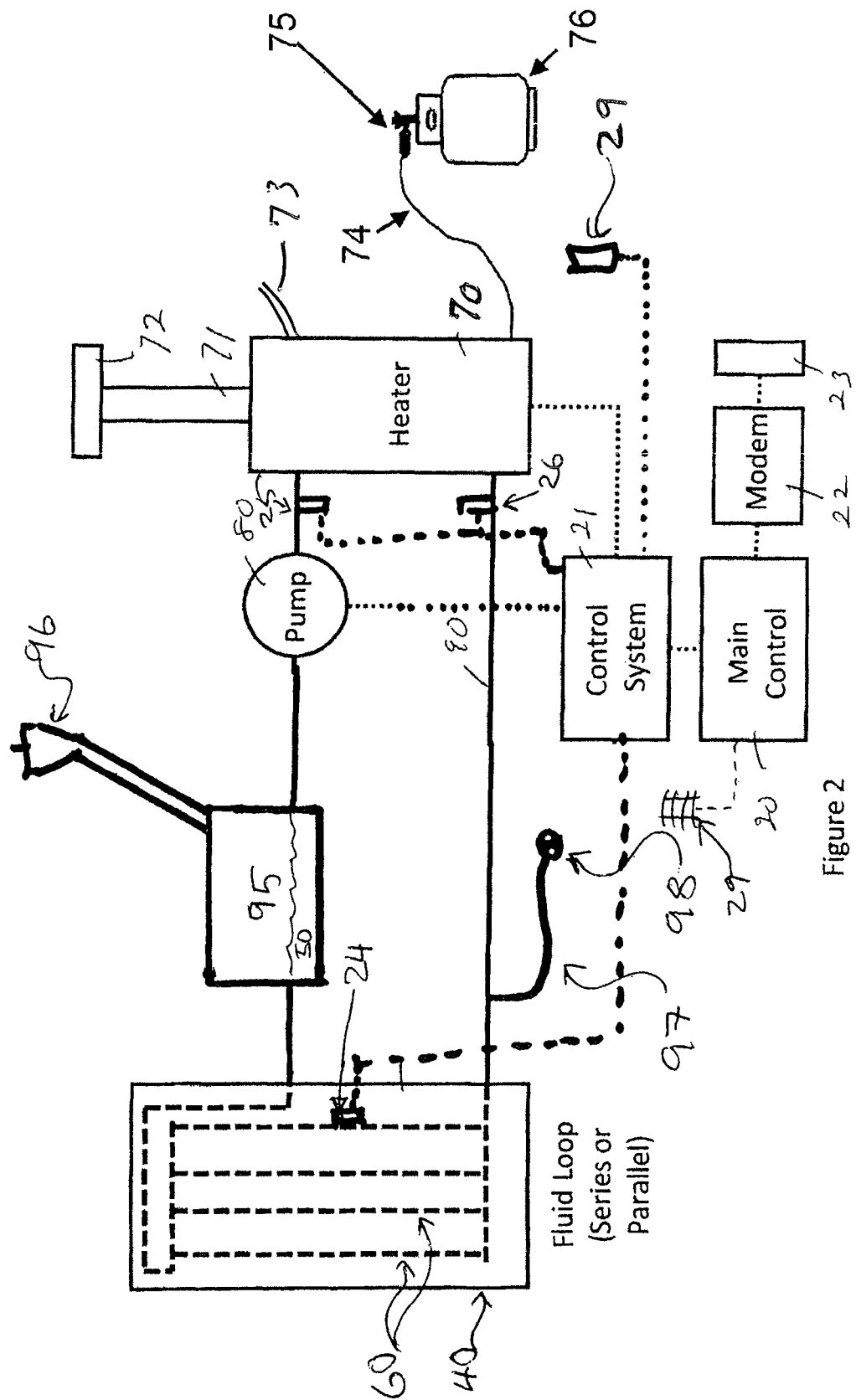
FIG. 2 is a schematic representation, or block diagram, showing the various components of the preferred embodiment of the inventive system, and how they work together as a system.

FIG. 2 shows the preferred embodiment of the inventive system in schematic form. Mirror 40 is heated by fluid 50 circulating within circulation pipes 60. This fluid is heated by catalytic propane fired heater system 70. This heater system consists of a porous refractory catalytic combustion element, in which the propane is oxidized, releasing its heat energy. This type of heater is more efficient than open flame heaters, and is also safer (particularly since it is located inside of a housing with potentially flammable materials) than heaters with an open flame. The combustion element is substantially surrounded by, and in close thermal contact with, the inner walls of a water jacket which allows the circulating fluid to absorb the heat energy released. Fluid circulation pump 80 serves to keep fluid 50 circulating so as to efficiently transfer the heat from the heater and distribute the heat evenly over mirror 40.

The capability to distribute a greater quantity of heat than prior art systems, and also to distribute this heat more evenly over the mirror than was possible with prior art systems, represent significant and unique improvements over the prior art.

The circulation system also contains auxiliary components hoses 90 to interconnect the pump, heater and circulation pipes. Reservoir 95 allows for the expansion and contraction of the working fluid 50 as its temperature changes. Fill/vent fitting 96 is provided to facilitate filling the system with fluid 50 and to allow the pressure inside the circulation system to remain in equilibrium with the ambient pressure. Flexible drain hose 97 and closure 98 are provided to facilitate draining fluid 50 into a suitable container for later reuse or recycling and to prevent spillage in situations where the system must be drained for maintenance, shipping, and the like.

A control system 21 is provided to control the heater 70 and the circulation pump 80. This control system also provides circuitry to interface with sensors discussed below, and communicates with the main controller 20 of the overall sodar apparatus. Control system 21 may consist of simple interfaces to the pump, heater and sensors, so as to allow heater control software within overall sodar system controller 20 or elsewhere to control the heater, or control system 21 may contain control microprocessors which significantly accomplish the control of the heater system internally. The proportion of the control system contained within main controller 20 and heater controller 21 are a matter of convenience apparent to one skilled in the art.

Controller 20 may be further connected to remote and external automatic, semi-automatic or manual control systems through satellite modem 22 and antenna 23, or through other suitable control and communications means which would be apparent to one skilled in the art. Such communications connection may provide the ability to manually control the heater, to semi-automatically control the heater, to automatically control the heater from a remote site, for example at the manufacturer's home office, or to download automatic heater control algorithms to controllers 20 and/or 21 from the remote site, said control programs being locally executed within controllers 20 and 21.

Controller 21 is operatively connected to moisture sensor 29 which provides one means of sensing or detecting precipitation. Controller 21 is also operatively connected to temperature sensors 24, 25 and 26 which monitor the temperature on the mirror, the temperature at the heater outlet, and the temperature at the heater inlet respectively in order to monitor system operation. An ambient air temperature sensor 29 is provided for other purposes, being used by controller 20 to accurately steer the sound beams of the sodar apparatus, but may also be used by the heater control system to determine whether precipitation, if present, is falling in the form of rain or in a potentially frozen form which may need to be melted off of mirror 40.

One strategy of controlling the system is as follows: in operation, the heater system remains off at most times. When the moisture sensor senses more than trace amounts of precipitation, and when either the ambient air temperature or the mirror temperature are close to or below the freezing point of water, the heater system will be activated, first by starting the heater, and once the heater is operating by turning the circulation pump on. Once the pump is running, operation will continue until the precipitation sensor no longer detects precipitation, and until the mirror surface has reached a sufficiently high temperature to insure that all snow or ice has melted. Other control strategies, based on observation of sodar system performance, remote sensing of likely precipitation, semiautomatic or manual remote control from the sodar user's or manufacturer's office are possible.

Heater 70 is provided with flue 71 and exhaust vent 72 to carry moisture and other combustion byproducts out of the apparatus enclosure. Air intake 73 is provided to supply air to heater 70 for combustion. Heater 70 is supplied with gas by hose 74, regulator 75, and tank 76. Tank 76 can be located within the sodar housing, and is of the easily available and readily refillable type (20 pound liquid propane tank) typically used for gas-fired barbecue grills. Alternatively tank 76 could be a larger tank external to the housing, according to needs of the application as governed by ease of visiting the site to refill the tank, anticipated heater demand, etc.

Figure 3:
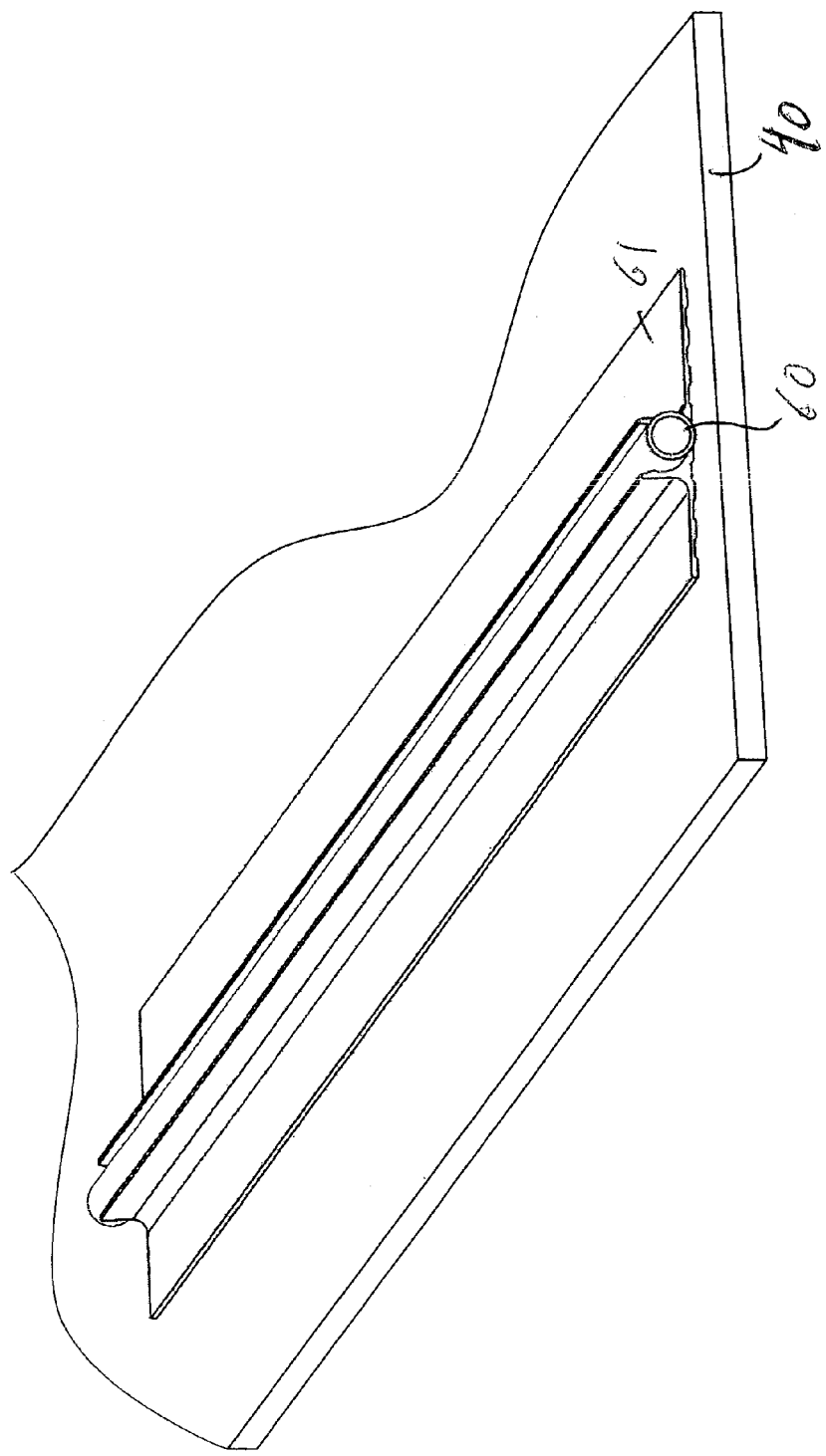
FIGS. 3, 3A, 3B and 3C show the details of the mounting of the piping network to the rear of the mirror in the preferred embodiment and an alternative embodiment.

FIG. 3 shows details of the preferred mechanical and thermal connection of circulation pipes 60 to the mirror 40 for the preferred embodiment. Early testing of the apparatus showed that a critical and difficult design requirement was the efficient transfer of heat from fluid 50 within circulation pipes 60 to mirror 40. Simple physical contact between the pipe and the mirror, or proximity of the pipe to the mirror, was inadequate. Simple adhesive bonding of the circulation pipes directly to the mirror was problematic from a quality control point of view and had marginal heat transfer properties.

Figure 3A:
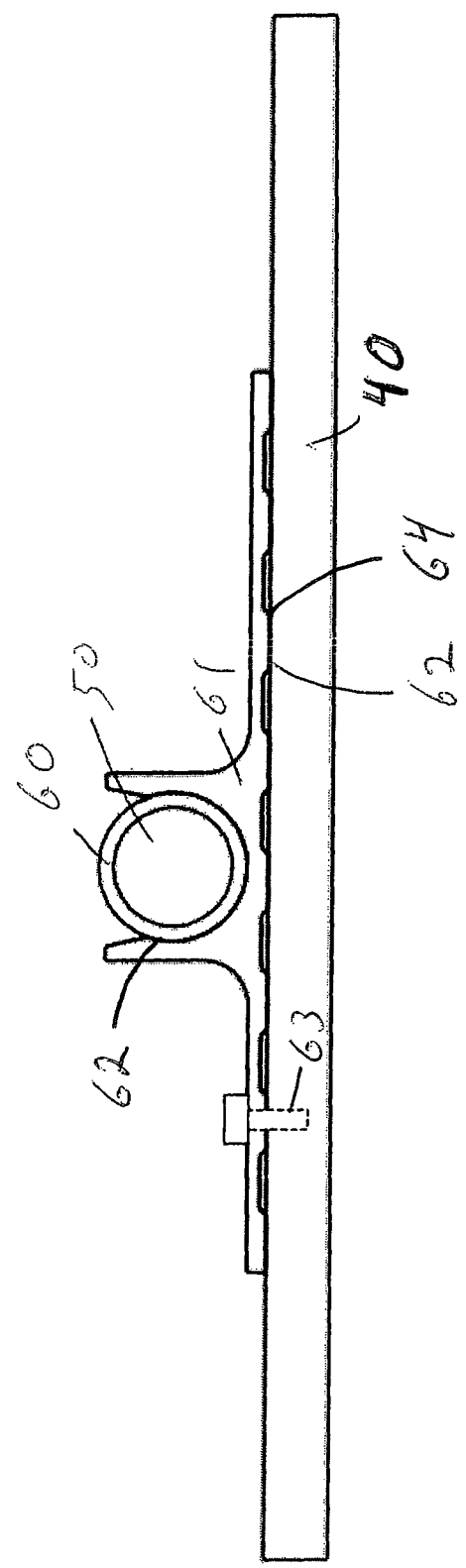
Figure 3B:
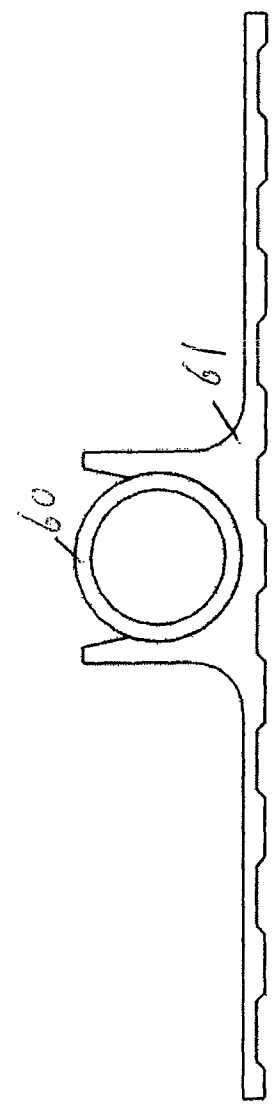
Figure 3C:
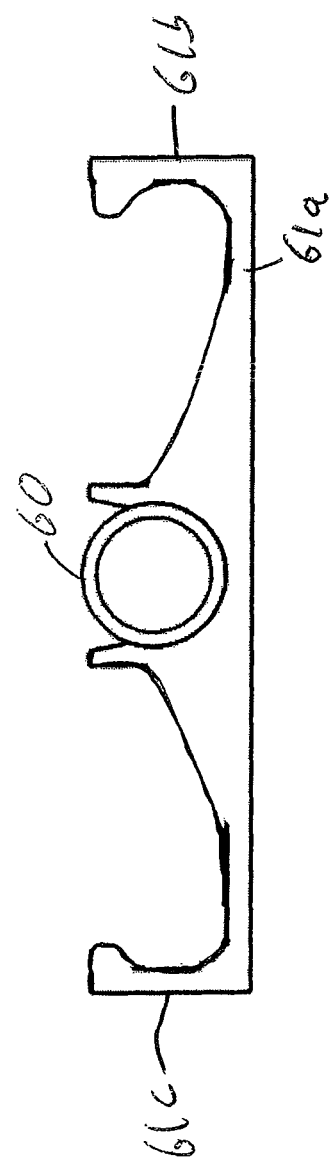

FIG. 3A shows in cross section the use in the preferred embodiment of one or more aluminum heat transfer extrusions 61 which are fastened to the mirror with thermally conductive epoxy 62, and optionally with fasteners 63 as well. Circulation pipes 60 are slid axially into extrusion 61. Thermally conductive epoxy 62 is also used between pipe 60 and extrusion 61 to provide an effective heat transfer between the pipes 60 and the extrusions 61. This approach solves a number of problems. For one, heat is effectively and efficiently transferred from the fluid 50 to the mirror 40 with a minimum of thermal resistance by virtue of the relatively large surface area 64 over which epoxy 62 provides a heat transfer path between extrusion 61 and mirror 40, and by virtue of the relatively large surface area of the heat transfer path between pipe 60 and extrusion 61. Further, extrusion 61 provides a means of distributing the heat more evenly over the mirror 40. Extrusion 61 may be a stock extrusion used for radiant heating systems in building HVAC systems, as shown in FIG. 3B. In the preferred embodiment, extrusion 60 is a custom extrusion 61a with a different cross-sectional shape, as shown in FIG. 3C, where the thickness of the aluminum is tapered from the pipe as shown, so as to maximize the efficiency of this heat distribution. This extrusion also includes stiffening flanges 61b and 61c, as shown in FIG. 3C, so that the extrusion can serve a dual function, both serving the heating needs and also serving as a structural stiffening element for the mirror.

In the preferred embodiment, the pipe 60, the extrusion 61 and the mirror 40 are all aluminum and differential thermal expansion between these elements is not an issue. Alternatively pipe 60 might be made of copper in which case differential thermal expansion between the pipe and the other elements might be a concern. In this case thermally conductive grease might be used in place of thermally conductive epoxy to establish the thermal contact between pipe 60 and extrusions 61, 61a while still allowing these parts to slide relative to each other so as to allow the differential expansion to take place without causing harm.

Conductive structures or plates other than extrusions 61, 61a could alternatively be used, as long as the pipes or conduits carried the heat transfer fluid could be mechanically and thermally coupled to them, and they made good thermal contact with a sufficient portion of the back of the mirror to achieve the desired function of clearing the mirror surface of ice and snow. Another alternative would be to design the mirror to have fluid channels through which the heat transfer fluid could be circulated. For example, these channels could be internal to the mirror, or perhaps directly coupled to the back of the mirror through brazing or the like as long as there was no issue created by thermal mismatch between the materials of the channels or conduits and the mirror.

Figure 4A:
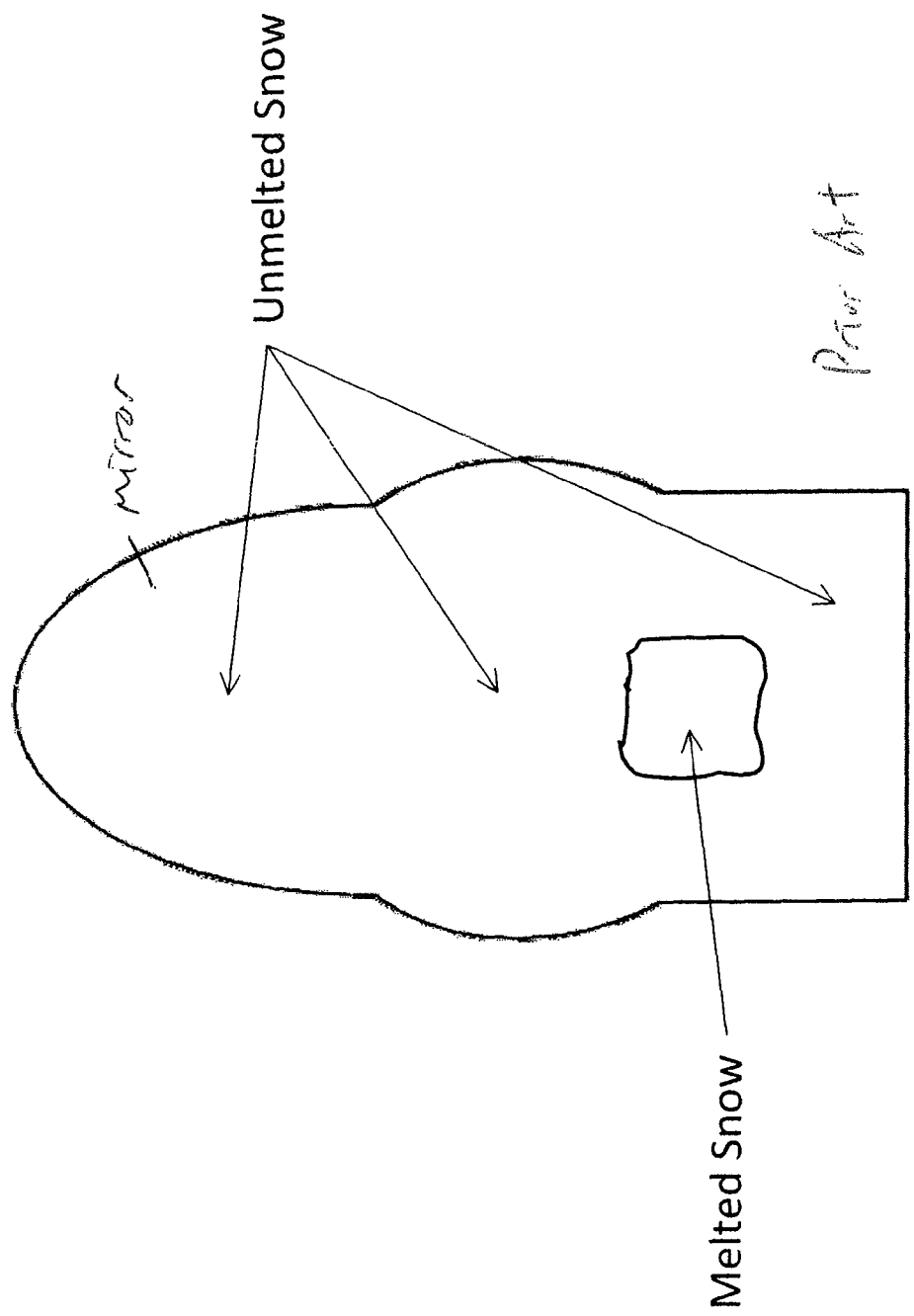

FIG. 4A is a sketch taken from a photograph of snow melting performance of an earlier (prior art) attempt at heating the mirror using a radiant catalytic heater radiating onto the rear surface of the mirror. Although the snow melting capability of this attempt far exceeds the meager capability of an electrically based system, it is clear that the system is virtually useless since the heat does not distribute sufficiently over the mirror, but is concentrated only in the center area.

Figure 4B:
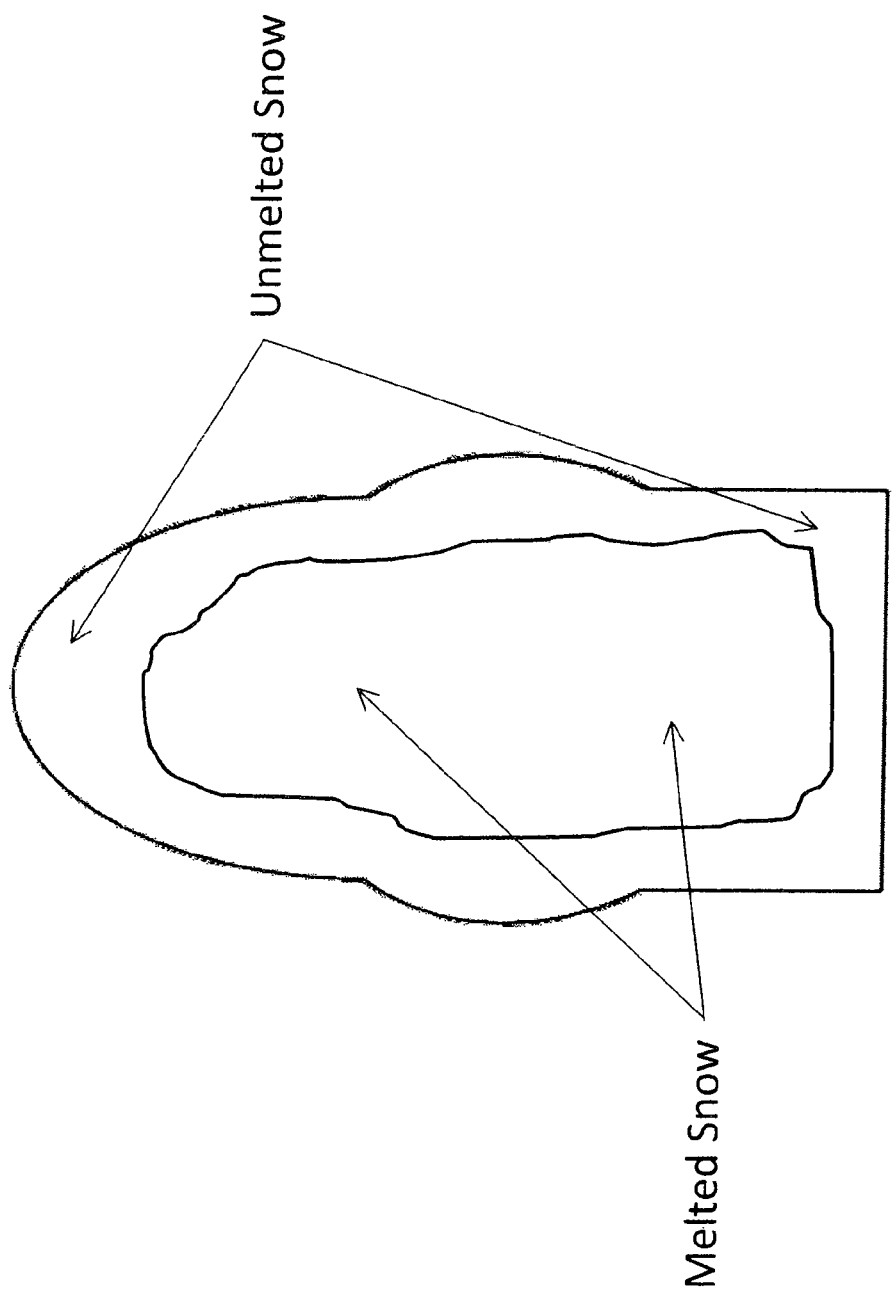

FIG. 4B is a sketch taken from a photograph documenting an early version of the inventive heating apparatus in which the pipes were directly bonded to the back of the mirror using thermally conductive epoxy. It is clear that the heat is much more effectively and evenly distributed, and that the system is marginally sufficient for the desired application. Uneven heating is still visible in this image, however, due to poor and uneven thermal contact between the circulation pipes and mirror obtained by direct bonding of the pipes to the mirror with thermal epoxy.

Figure 4D:
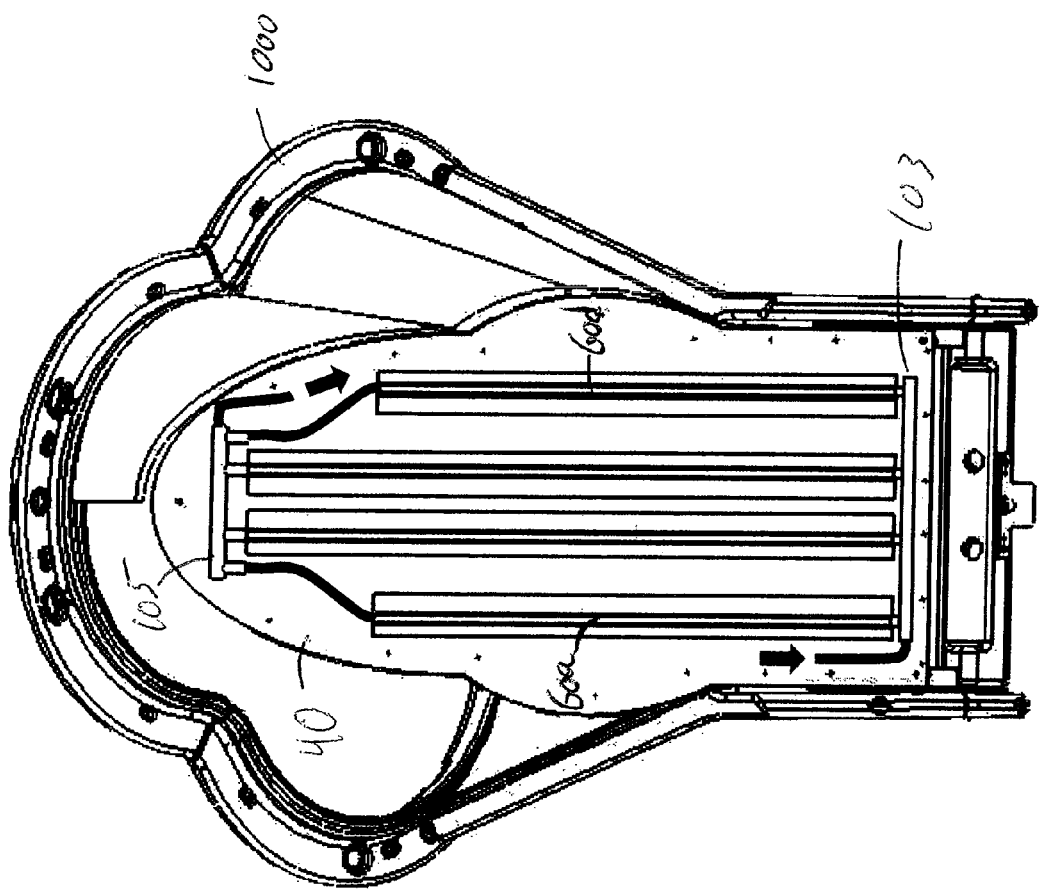
FIG. 4D is a rear view of the mirror detailing the placement of extrusions and flow of heat transfer liquid in an embodiment of the invention.

FIG. 4C shows the testing of the embodiment of the inventive heater system shown in FIGS. 1-3. It is apparent that the heat distribution is significantly more even and efficient in this case. It remains clear that pipes 60 should be extended as close as possible to the ends of extrusions 61, and that extrusions 61 in turn should extend as close as practical to the perimeter of mirror 40. Further it is clear that pipe 60d in FIG. 4D is heating the right side of mirror 40 more slowly that pipe 60a heats the left side of mirror 40. We theorize that this is due to unequal fluid flow between pipes 60d and 60a. By rearranging the inlet and outlet to an inlet manifold 103 and an outlet manifold 105 serving pipes 60, so that inlet and outlets are on opposite ends of the manifolds as shown in FIG. 4D, flow should be substantially better balanced, and heating substantially more even over the surface of the mirror.

Figure 5:
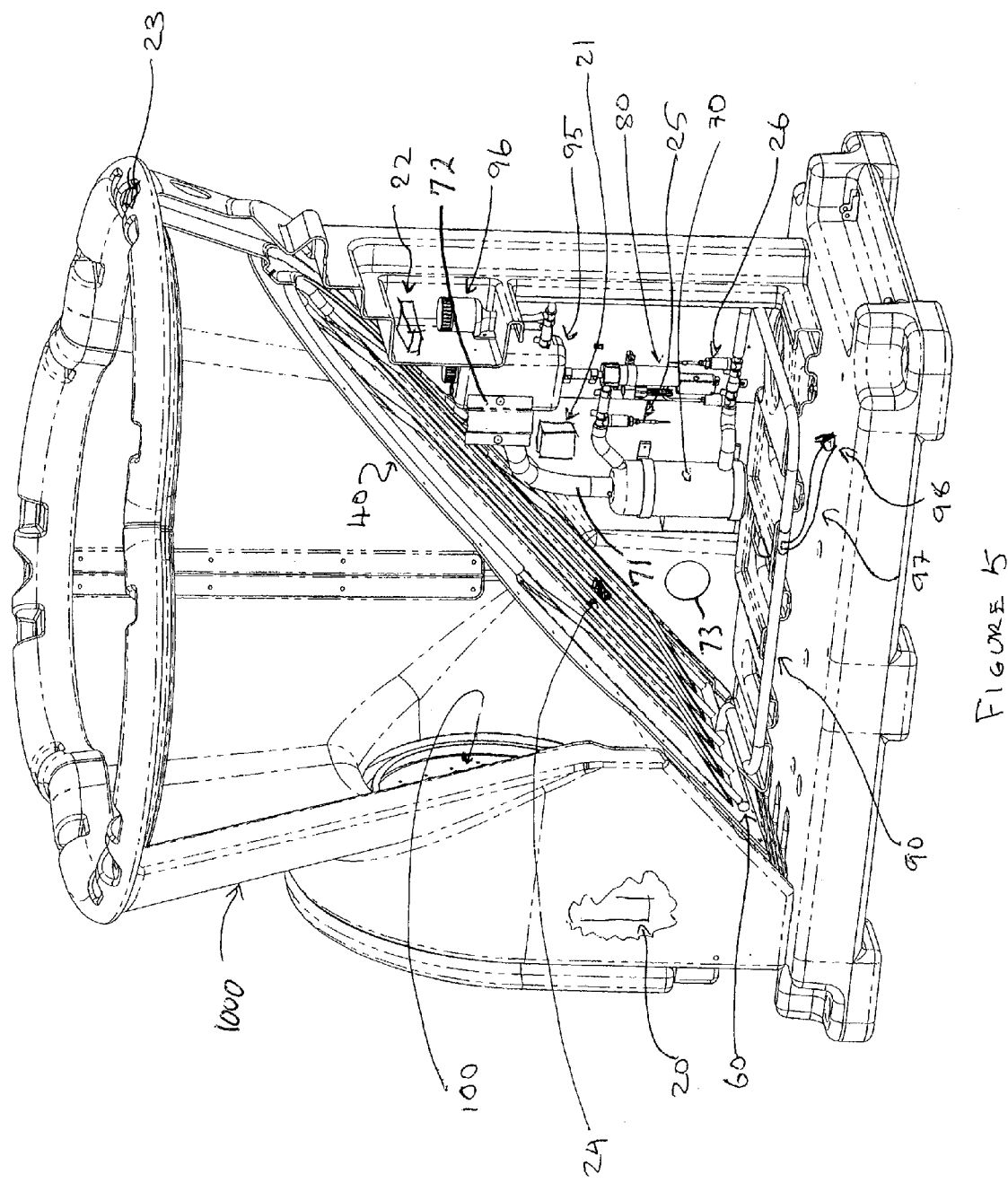
FIG. 5 is a perspective partially cross-sectional view of the preferred embodiment of the inventive system.

FIG. 5 is an isometric view of the sodar apparatus showing the components of the heater system in pictorial form, the numbering being the same for the various components as in FIG. 2, and the text above referring to FIG. 2 can be used as referring to FIG. 5.

Figure 6:
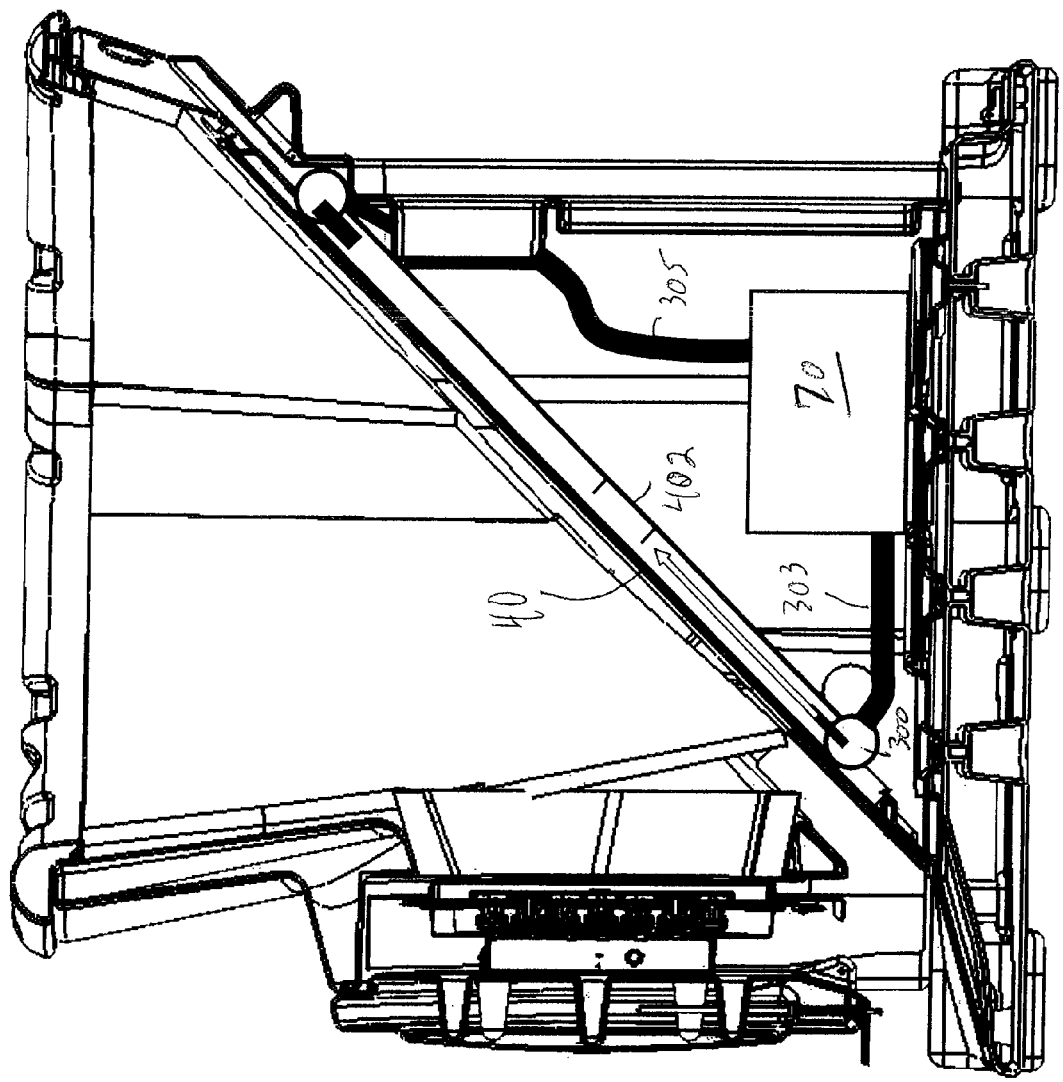
FIG. 6 is conceptual cross-sectional sketch of an alternative embodiment where the working heat transfer fluid is air.

FIG. 6 shows an alternative embodiment where the working fluid for transferring the heat from the heater system is air rather than liquid, where the heater 70 is of a type designed to heat air, and where the pump is replaced by natural convection or by an electrically driven blower 300 that blows the heated air supplied from heater 70 through tube 303 into plenum 402 mounted behind mirror 40. Tube 305 returns the air to heater 70. This alternative embodiment has advantages in that constructing air circulation passages may be significantly easier than constructing a leak-proof plumbing system for the liquid working fluid. Air will have poorer heat transfer properties, however, and an air blower, if needed, is more likely to cause noise that can disrupt operation of the sodar system than a liquid circulation pump. Nevertheless, there may be applications where the air based system is preferable.

Figure 7:
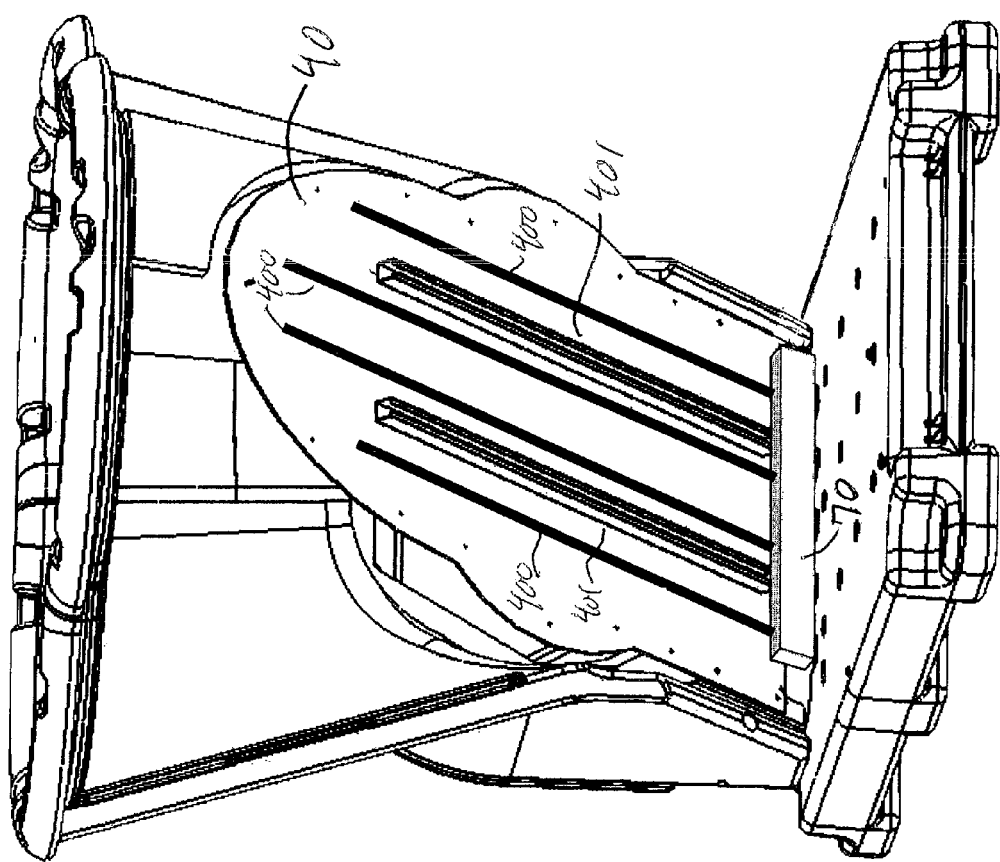
FIG. 7 is a conceptual cross-sectional sketch of another alternative embodiment where heat pipes are used.

In FIG. 7, heat pipes 400 are used to contain a mixed-phase working fluid for heat transfer which distributes the heat from the heater area to the extremity of the mirror 40 in vapor form, and is returned to the heater area be reheated as condensate. (Mirror structural supports 401 are also shown in this drawing). In this case, heater 70 may be a radiant heater, directly heating a portion of mirror 40, and also supplying heat in radiant form to heat pipes 400. Alternatively, heater 70 might be specially designed to heat the heat pipes directly. These alternative embodiments have great potential advantages of simplicity and reliability, corresponding to the simplicity and reliability which makes heat pipes desirable for spacecraft and laptop computer thermal management systems. On the other hand, a heat pipe system presents design challenges which may be more easily met after gaining experience with system requirements from testing with the circulating liquid system of the preferred embodiment.

Figure 8:
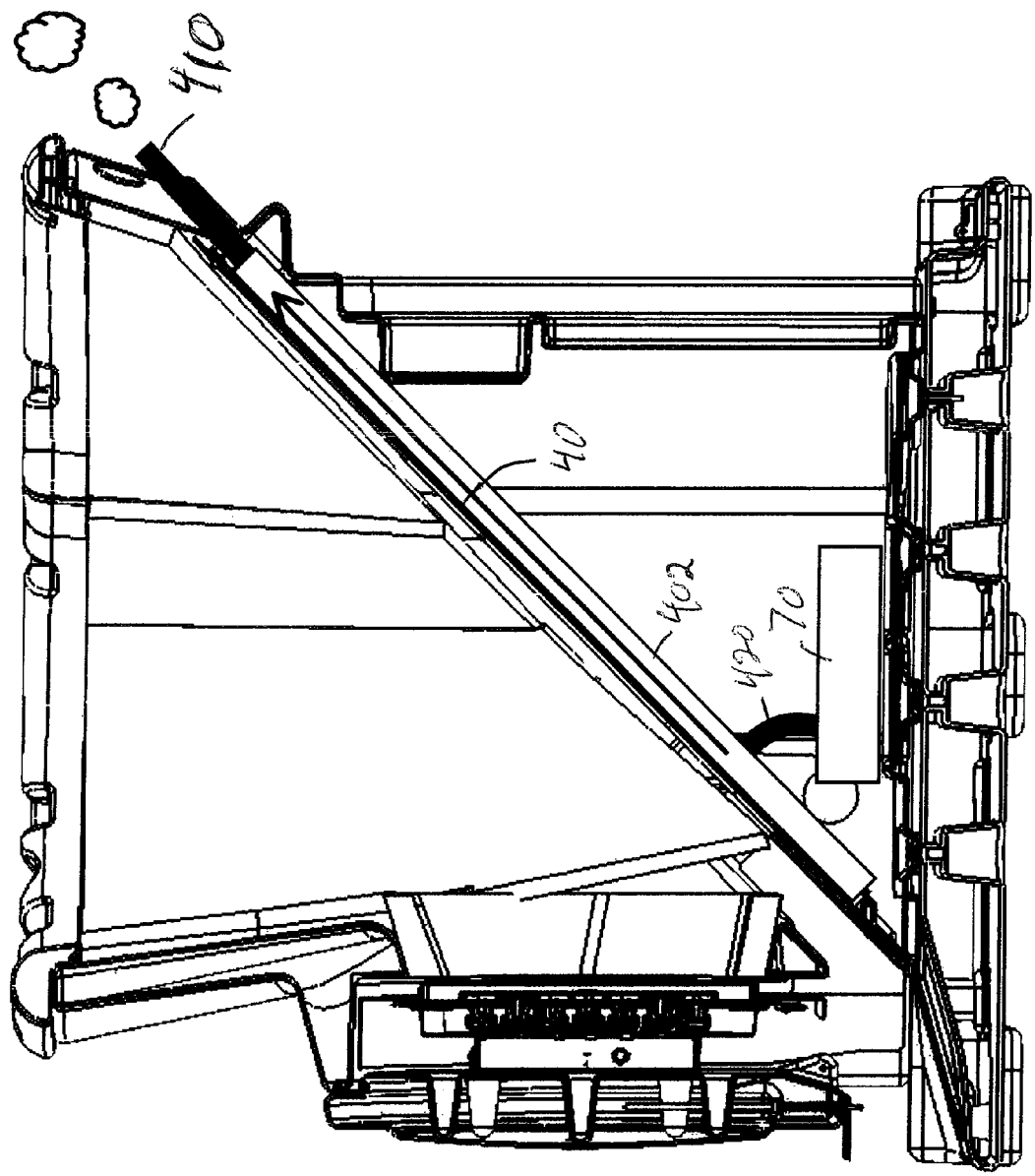
FIG. 8 is a conceptual cross-sectional sketch of another alternative embodiment where the heater exhausts within a plenum mounted on the back of the mirror.

FIG. 8 shows an alternative embodiment using gas phase fluid as a heat transfer medium, similar to the system shown in FIG. 6, but in this case the heater 70 exhausts directly into a plenum 402 mounted behind mirror 40. The plenum is equipped with vent 410 and inlet 420 so as to allow sufficient combustion byproducts to escape, and sufficient fresh air to enter to support combustion. The heat transfer fluid is thus a mixture of air heated by heater 70, and exhaust gases from the heater. This alternative embodiment might have advantages in terms of simplicity and efficiency.

Figure 9:
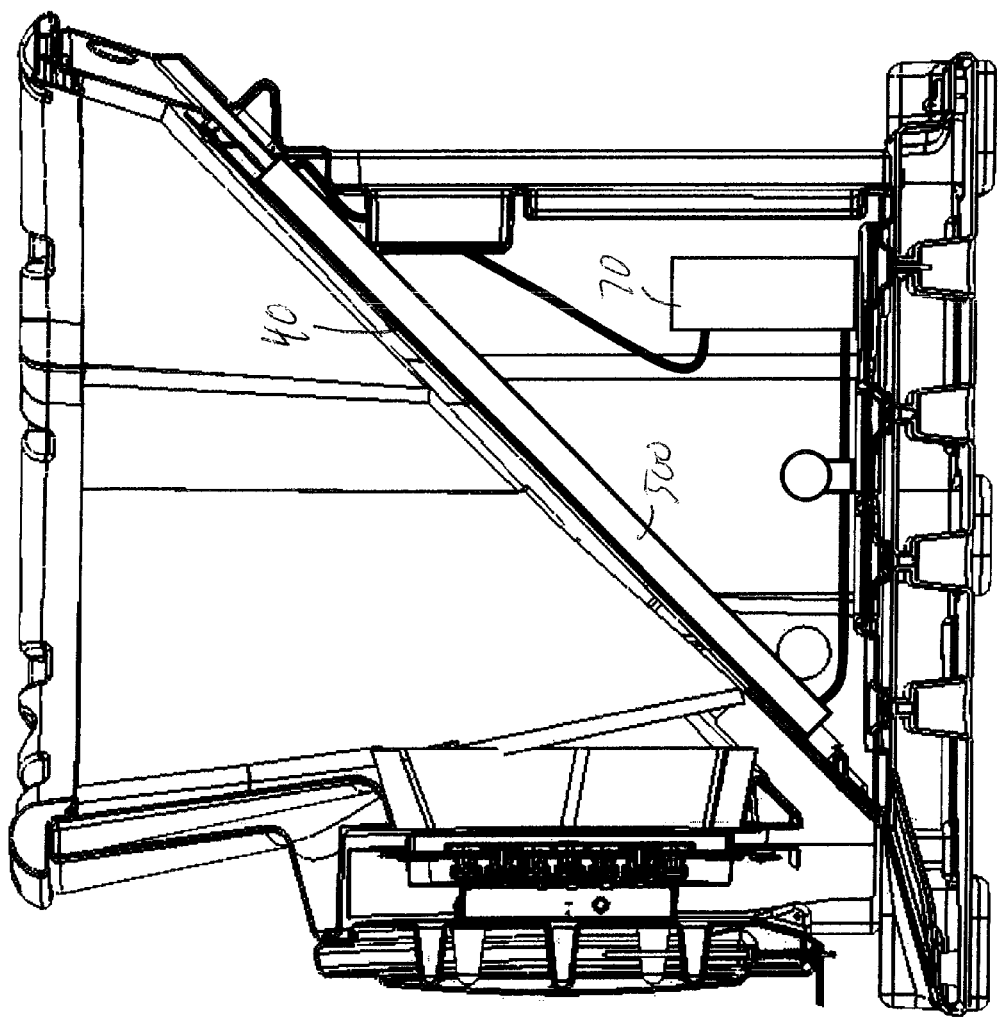
FIG. 9 is a conceptual cross-sectional sketch of another embodiment where the piping system is replaced by a liquid plenum chamber beneath the mirror.

FIG. 9 shows an alternative embodiment where the circulation pipes 60 are replaced by a liquid jacket 500, which allows the liquid heat transfer fluid 50 to conduct heat directly to substantially all of the rear surface of mirror 40. This alternative embodiment has advantages in that the heat is evenly distributed, with reduced quantities of costly aluminum extrusions necessary to insure adequate heat distribution. On the other hand, the fabrication of the jacket 500 presents structural difficulties in that the system must be leak-free, and in that the hydrostatic force at the lower end of the chamber is significant due to the relatively large areas over which the hydrostatic pressure of the working fluid acts.

Figure 10A:
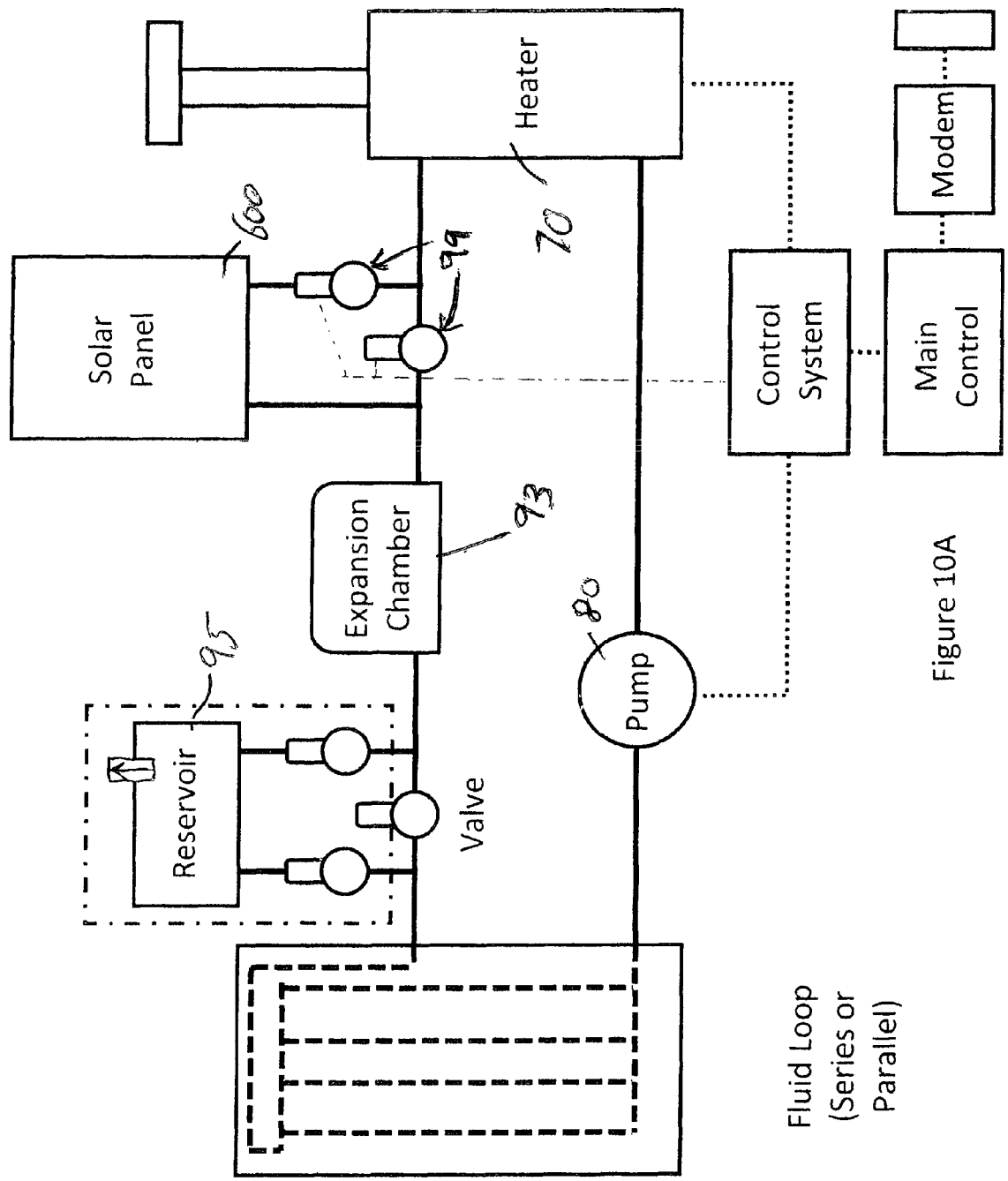
FIGS. 10A-10C are schematic diagrams of alternative embodiments where heat is provided by an auxiliary solar panel in addition to the catalytic heater; solely by a solar panel system; and by recovering waste heat from an internal combustion powered generator used for other purposes, respectively.
Figure 10B:
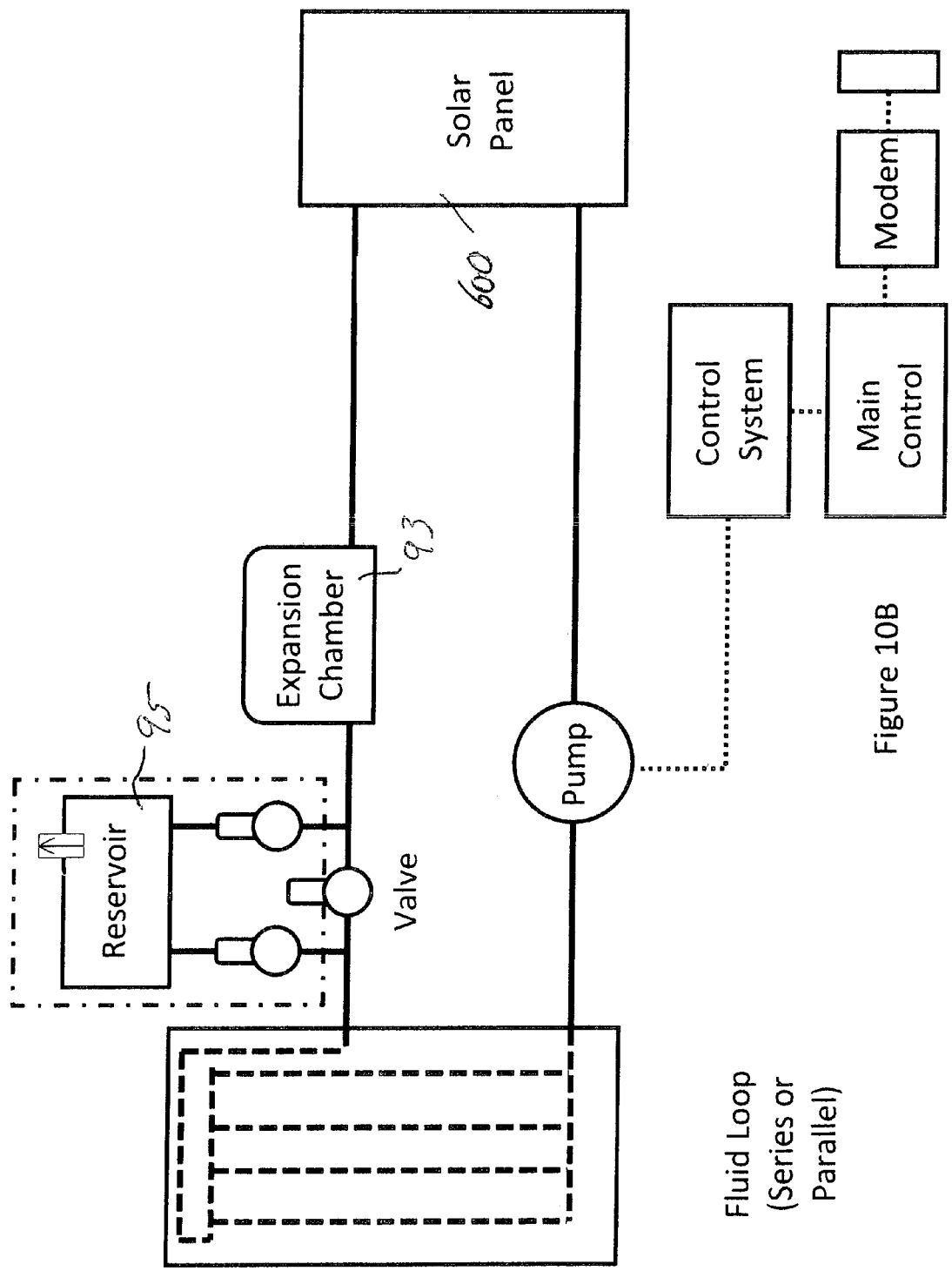
Figure 10C:
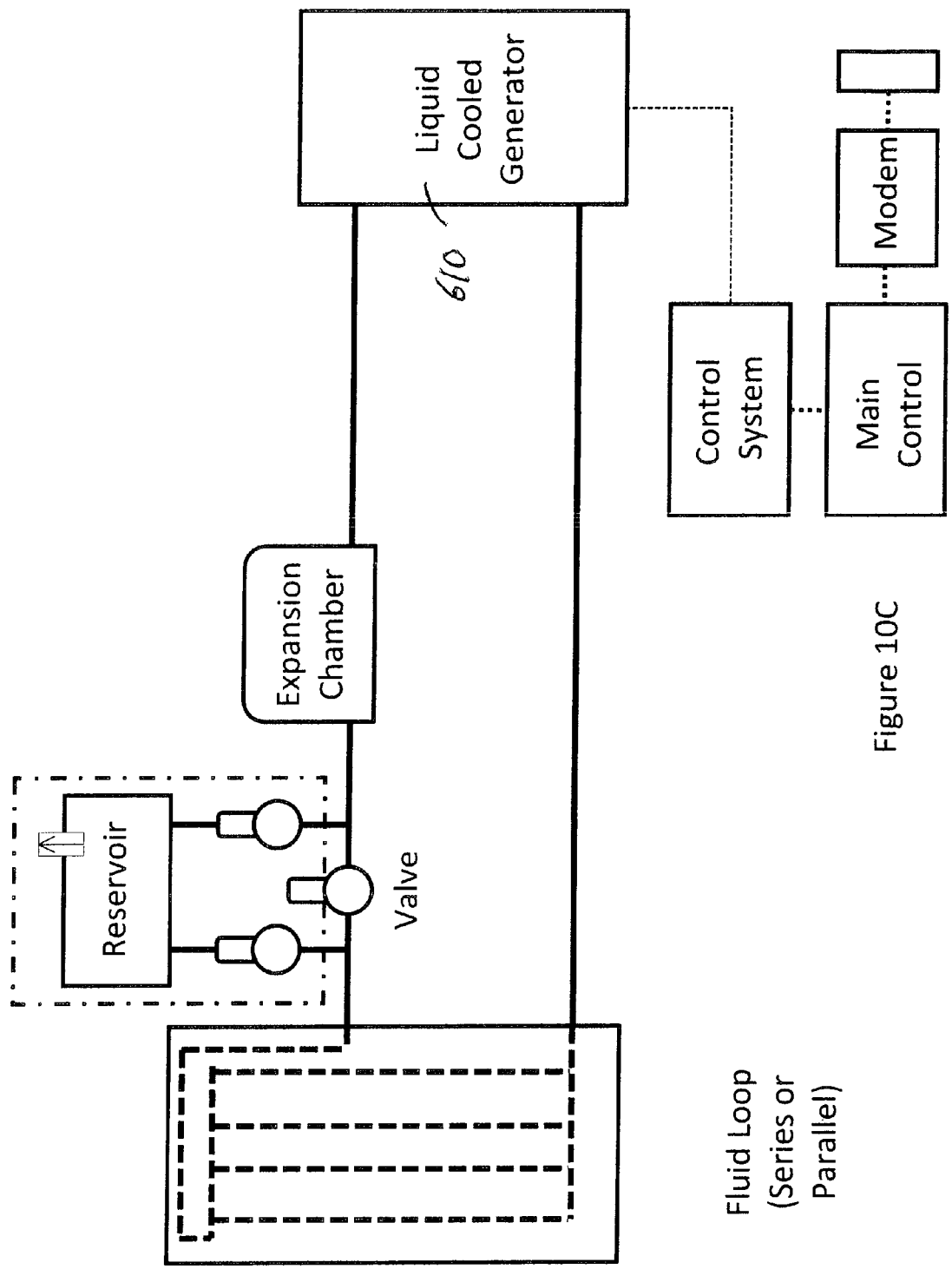

FIGS. 10A, 10B and 10C schematically depict further alternative embodiments of the proposed heating system. In FIG. 10A, solar thermal panel 600 is placed in the liquid circulation system, for example between pump 80 and heater 70. Solenoid operated valves 99 are also included so that the control system can bypass solar thermal panel 600 in cloudy conditions during which the panel might act as a loss, rather than a source of heat. Cloudiness can be determined using a temperature sensor in the solar panel, to detect whether the panel is cooler than the fluid it is intended to heat. The use of a solar panel may have significant advantages in some applications where access for supplying replacement fuel for the unit is difficult. Although the solar heating panel will usually not operate when precipitation is actually falling, it may significantly reduce fuel demand in cases where ice or snow remains on the mirror in need of melting subsequent to the precipitation event. In extreme cases, where the gas supply in tank 76 is exhausted, the solar panel may allow the sodar apparatus to eventually return to normal operation far sooner than would be the case without solar heating, in which latter case the sodar could remain out of operation for weeks or months if the weather conditions prohibited service personnel from visiting the apparatus to replace the fuel supply or manually remove the precipitation from the mirror. In this embodiment, the height of the top of the solar panel might be higher than suitable permanent mounting locations for reservoir 95 and fill fitting 96. In this case, it is possible that the working fluid 50 might siphon out of the solar panel 600, and overflow from the vent. For this reason it may be preferable to add a sealed expansion chamber 93, to allow for expansion and contraction of the working fluid 50. In this case reservoir 95 might be a removable service apparatus temporarily mounted at a suitable height above the solar panel's top and equipped with suitable valves to allow filling and bleeding air out of the system, instead of having it as a built-in part of the heater system.

FIG. 10B shows a further alternative embodiment where heater 70 is replaced entirely by solar panel 600. This alternative embodiment may be useful in situations where regulatory requirements or inaccessibility for refueling make a fuel-fired heating system unacceptable. Again, in this embodiment, expansion chamber 93 may be added and reservoir 95 might be a removable service apparatus.

FIG. 10C shows a further alternative embodiment where heater 70 and perhaps pump 80 are eliminated, and heat and perhaps circulation motive force are provided to the working fluid by an internal combustion engine based generator system 610 used to power the sodar apparatus. Such an alternative embodiment would be of little use in the sodar apparatus shown and described in the following pending applications: Ser. No. 11/934,915 filed on Nov. 5, 2007, Ser. No. 12/117,994 filed on May 9, 2008, Ser. No. 12/125,166 filed on May 22, 2008, Ser. No. 12/130,106 filed on May 30, 2008, and Ser. No. 12/129,806 filed on May 30, 2008 (all of which are incorporated herein by reference), since this apparatus operates with sufficient electrical efficiency that solar photovoltaic panels with battery storage can reliably power the system. Less efficient sodar apparatuses, which rely on engine based generators might significantly benefit from the alternative embodiment shown in FIG. 10C.

The particular construction, materials and dimensions described herein are not limitations of the invention, as other constructions can accomplish the invention described herein.

Recitation ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illustrate the invention and does not pose a limitation on the scope of the invention.

A variety of modifications to the embodiments described herein will be apparent to those skilled in the art from the disclosure provided herein. Thus, the invention may be embodied in other specific forms without departing from the spirit or essential attributes thereof.

Although specific features of the invention are shown in some figures and not others, this is for convenience only, as features may be combined in other fashions in accordance with the invention.

What is claimed is:

1. A system for heating surfaces within a remote SODAR apparatus, the system comprising:
   a transducer array comprising a plurality of acoustic transducers;
   a sound mirror comprising a rear surface and a sound-reflective surface, wherein the sound-reflective surface is disposed opposite the transducer array and on an opposite side of the sound mirror as the rear surface;
   a drain path leading out of the remote SODAR apparatus;
   a heater;
   a closed loop system coupled with the rear surface of the sound mirror and coupled with the heater, the closed loop system comprising channels and a liquid disposed within the channels, the closed loop system arranged to circulate heated liquid within the channels from the heater to the rear surface of the sound mirror and proximate the drain path;
   one or more conductive structures thermally coupled with the closed loop system and the rear surface of the sound mirror;
   sensors that sense precipitation and temperature; and
   a controller coupled with the sensors and the heater, the controller configured to cause the heater to heat the liquid in the closed loop system in response to either or both sensed precipitation and sensed temperature from the sensors.

2. The system of claim 1 where the heater is fueled by a combustible gas.

3. The system of claim 2 where the combustible gas is propane, and where the heater operates catalytically, oxidizing the propane without an open flame.

4. The system of claim 1 where the closed loop system comprises an electrically driven pump that circulates the liquid from the heater to the sound mirror, proximate the drain path and rear surface.

5. The system of claim 4 further comprising the one or more conductive structures to which one or more of the enclosed channels are coupled, the conductive structures sized and shaped so as to conform to the outside surface of the channels over a majority of the channel's circumference, and with a generally flat surface that is coupled to the rear surface of the sound mirror, to accomplish the effective thermal connection between the channels and the sound mirror.

6. The system of claim 5 further comprising a thermally conductive epoxy adhesive used to make a joint of low resistance to heat transfer between the conductive structures and the sound mirror.

7. The system of claim 6 where the thermally conductive epoxy adhesive is additionally used to make a joint of low resistance to heat transfer between the enclosed channel and the conductive structure.

8. The system of claim 7 in which the enclosed channels, the conductive structures and the sound mirror are all made of a same metal.

9. The system of claim 5 further comprising a thermally conductive grease used to make a junction of low resistance to heat transfer between the conductive structure and the enclosed channel, the conductive grease allowing the channel and the conductive structure to shift relative to each other as necessary so as to minimize damaging stresses in either component due to differential thermal expansion.

10. The system of claim 4 in which the heater further comprises a solar heating panel through which the liquid can also be circulated, to provide supplemental solar heat to the liquid.

11. The system of claim 1 where the liquid is circulated by convection.

12. The system of claim 4 in which the closed loop system is coupled to the sound mirror so as to provide a transfer of heat to substantially all of the rear surface of the sound mirror.

13. The system of claim 12 in which the liquid circulates by a pump or convection.

14. The system of claim 4 in which the liquid is an antifreeze solution.

15. The system of claim 1 where the heater comprises a solar panel.

16. The system of claim 1 where the heater comprises an internal combustion engine with a liquid cooling system within the closed loop system, thereby sharing the liquid between the heater and the cooling system of the internal combustion engine.

17. The system of claim 1 in which the controller comprises a sensor or system to sense precipitation, an ambient temperature sensor and a sound mirror temperature sensor that senses the temperature of the sound mirror, wherein the controller turns on the heater upon the simultaneous detection of precipitation and an ambient temperature or a sound mirror temperature close to or below the freezing point of water.

18. The system of claim 17 in which the controller turns off the heater when the sound mirror temperature reaches at least a certain temperature above freezing.

19. The system of claim 1 in which the liquid comprises a low boiling point fluid.

20. A system for heating surfaces within a remote SODAR apparatus, the system comprising:
- a transducer array comprising a plurality of acoustic transducers;
- a sound mirror comprising a rear surface and a sound-reflective surface, wherein the sound-reflective surface is disposed opposite the transducer array and on an opposite side of the sound mirror as the rear surface;
- a drain path leading out of the remote SODAR apparatus;
- a closed loop which comprises one or more enclosed liquid-carrying channels and comprising a liquid disposed within the liquid-carrying channels, wherein the liquid comprises a liquid antifreeze solution;
- a heater fueled by propane and operating catalytically to oxidize the propane without an open flame to heat the liquid disposed within a portion of the liquid-carrying channels;
- an electrically driven pump that circulates the liquid through the liquid carrying channels from the heater to the rear surface of the sound mirror and proximate the drain path;
- one or more conductive structures to which one or more of the enclosed liquid-carrying channels are coupled, the conductive structures sized and shaped so as to conform to the outside surface of the channels over a majority of the channel's circumference and with a generally flat surface that is coupled to the rear surface of the sound mirror, to accomplish the effective thermal connection between the channels and the sound mirror;
- a temperature sensor configured to measure a temperature of the sound mirror;
- a precipitation sensor;
- a controller that controls the operation of the heater, wherein the controller turns on the heater upon the simultaneous detection of precipitation from the precipitation sensor and a sound mirror temperature from the temperature sensor that is close to or below the freezing point of water, and turns off the heater when the sound mirror temperature reaches at least a certain temperature above freezing; and
- a thermally conductive epoxy adhesive used to make a joint of low resistance to heat transfer between the conductive structures and the sound mirror, and also used to make a joint of low resistance to heat transfer between the enclosed channels and the conductive structures, and in which the enclosed channels, the conductive structures and the sound mirror are all made of a same metal.

* * * * *